US009390617B2

(12) United States Patent
Pettey et al.

(10) Patent No.: US 9,390,617 B2
(45) Date of Patent: Jul. 12, 2016

(54) CAMERA MOTION CONTROL SYSTEM WITH VARIABLE AUTONOMY

(75) Inventors: Brian T. Pettey, Winfield, KS (US); Christopher L. Holt, Edina, MN (US)

(73) Assignee: RobotZone, LLC, Winfield, KS (US)

( * ) Notice: Subject to any disclaimer, the term of this patent is extended or adjusted under 35 U.S.C. 154(b) by 544 days.

(21) Appl. No.: 13/221,477

(22) Filed: Aug. 30, 2011

(65) Prior Publication Data

US 2012/0313557 A1 Dec. 13, 2012

Related U.S. Application Data

(60) Provisional application No. 61/495,568, filed on Jun. 10, 2011.

(51) Int. Cl.
*H04Q 9/00* (2006.01)
*G08C 17/00* (2006.01)
*G08C 13/00* (2006.01)

(52) U.S. Cl.
CPC ................ *G08C 17/00* (2013.01); *G08C 13/00* (2013.01)

(58) Field of Classification Search
CPC ........... H04N 5/23203; G08B 13/1963; G08B 13/19689; G03B 17/56; G03B 17/561
USPC .................. 348/211.99, 211.1–211.9, 211.13
See application file for complete search history.

(56) References Cited

U.S. PATENT DOCUMENTS 405,523 A 6/1889 Barton
1,320,234 A 10/1919 Johnson
1,371,622 A 3/1921 Hudson
2,420,425 A 5/1947 Hardwick
D150,753 S 8/1948 Carr
3,145,960 A 8/1964 Langdon
3,953,774 A * 4/1976 Sato ......................... B41J 29/38 318/594
D243,929 S 4/1977 Dimicelil et al.
4,033,531 A 7/1977 Levine
4,044,978 A 8/1977 Williams
4,433,825 A 2/1984 Dernedde et al.

(Continued)

FOREIGN PATENT DOCUMENTS

JP 2004077706 A 3/2004
WO WO 2013123547 A1 8/2013

OTHER PUBLICATIONS

The related U.S. Appl. No. 13/083,912, filed Apr. 11, 2011.

(Continued)

*Primary Examiner* — Amy Hsu
(74) *Attorney, Agent, or Firm* — Katherine M. Scholz; Kelly, Holt & Christenson, PLLC

(57) ABSTRACT

Variable autonomy level control systems are provided. A control system illustratively include an analog communications support component, a digital communications support component, a processing component, and a motor controller. The processing component synthesizes inputs received from the analog and the digital communications support components to generate an output. The motor controller utilizes the output from the processing component to generate a control signal for a motor. In certain embodiments, the input from the digital communications support component includes an indication of an autonomy level, and the processing component synthesizes the inputs by applying the autonomy level to the input received from the analog communications support component.

19 Claims, 24 Drawing Sheets

(56) References Cited

U.S. PATENT DOCUMENTS

D296,075 S 6/1988 Jones
5,024,002 A 6/1991 Possati
5,053,685 A 10/1991 Bacchi
D327,518 S 6/1992 Pagel
D342,011 S 12/1993 Maguire
5,526,041 A * 6/1996 Glatt ................ G08B 13/19623 348/143
5,528,289 A * 6/1996 Cortjens .................. H04N 7/15 348/14.05
5,557,154 A 9/1996 Erhart
5,806,402 A 9/1998 Henry
5,817,119 A * 10/1998 Klieman ................ A61B 17/29 606/170
6,121,966 A 9/2000 Teodosio et al.
6,249,091 B1 * 6/2001 Belliveau ............. H05B 37/029 315/312
6,281,930 B1 * 8/2001 Parker .................... H04N 5/232 250/206.2
6,396,961 B1 * 5/2002 Wixson ................. G06T 7/0018 348/E5.046
6,624,846 B1 9/2003 Lassiter
6,782,308 B2 8/2004 Yamaura
7,149,549 B1 12/2006 Ortiz et al.
7,270,589 B1 9/2007 Brown et al.
7,285,884 B2 10/2007 Pettey
7,336,009 B2 2/2008 Pettey
D571,643 S 6/2008 Newman
7,501,731 B2 3/2009 Pettey
7,527,439 B1 5/2009 Dumm
7,559,129 B2 7/2009 Pettey
7,671,497 B2 3/2010 Pettey
7,750,517 B2 7/2010 Pettey
7,750,944 B2 * 7/2010 Arbogast ............. G08B 13/196 348/211.7
7,795,768 B2 9/2010 Pettey
7,811,008 B2 10/2010 Dumm
7,859,151 B2 12/2010 Pettey
7,891,902 B2 2/2011 Pettey
7,900,927 B1 3/2011 Bliehall
7,934,691 B2 5/2011 Pettey
8,083,420 B2 12/2011 Dumm
8,200,078 B2 6/2012 Dumm
8,277,349 B2 10/2012 Erhart et al.
8,712,602 B1 4/2014 Oliver et al.
8,791,663 B2 7/2014 Pettey
8,791,911 B2 7/2014 Pettey et al.
8,816,553 B2 8/2014 Pettey
2001/0015918 A1 * 8/2001 Bhatnagar .......... G05B 19/0423 365/200
2002/0063799 A1 5/2002 Ortiz et al.
2003/0093430 A1 * 5/2003 Mottur ............... H04N 5/23203
2003/0174242 A1 9/2003 Carmi et al.
2004/0032495 A1 * 2/2004 Ortiz ...................... H04N 5/232 348/157
2004/0184798 A1 9/2004 Dumm
2005/0110634 A1 5/2005 Salcedo et al.
2006/0003865 A1 1/2006 Pettey
2006/0082662 A1 4/2006 Isaacson
2006/0114322 A1 * 6/2006 Romanowich .......... G06T 7/004 348/143
2006/0250357 A1 11/2006 Safai
2006/0256188 A1 * 11/2006 Mock ................ H04L 29/06027 348/14.09
2006/0269264 A1 11/2006 Stafford et al.
2006/0288375 A1 12/2006 Ortiz et al.
2007/0219666 A1 * 9/2007 Filippov .................. H04L 67/12 700/245
2008/0018737 A1 1/2008 Suzuki et al.
2008/0084481 A1 4/2008 Lindsay
2008/0088089 A1 4/2008 Bliehall et al.
2008/0149072 A1 * 6/2008 Rottenwohrer ..... F02D 41/2096 123/478
2009/0009605 A1 1/2009 Ortiz
2009/0073388 A1 3/2009 Dumm
2009/0128631 A1 5/2009 Ortiz
2009/0141130 A1 6/2009 Ortiz
2009/0179129 A1 7/2009 Pettey
2009/0247045 A1 10/2009 Pettey
2009/0310957 A1 12/2009 Matsushima et al.
2009/0322866 A1 * 12/2009 Stotz .................. G07C 9/00087 348/77
2010/0045666 A1 2/2010 Kornmann et al.
2010/0110192 A1 5/2010 Johnston et al.
2010/0141767 A1 6/2010 Mohanty et al.
2010/0328467 A1 * 12/2010 Yoshizumi ........... H04N 5/2251 348/169
2010/0328524 A1 12/2010 Yoshizumi
2011/0025861 A1 2/2011 Dumm
2011/0045445 A1 2/2011 Spychalski
2011/0050926 A1 * 3/2011 Asano ..................... G06F 21/36 348/211.2
2011/0085042 A1 4/2011 Lee et al.
2011/0089639 A1 4/2011 Bellamy et al.
2011/0115344 A1 5/2011 Pettey
2011/0205380 A1 * 8/2011 Shirakawa ............. H04N 5/247 348/211.9
2011/0267462 A1 * 11/2011 Cheng .................... H04N 7/181 348/143
2012/0139468 A1 6/2012 Pettey
2012/0200510 A1 8/2012 Pettey et al.
2012/0208150 A1 8/2012 Spychaiski
2012/0313557 A1 * 12/2012 Pettey .................... G08C 17/00 318/16
2013/0341869 A1 12/2013 Lenoff
2014/0298233 A1 10/2014 Pettey et al.
2014/0356817 A1 12/2014 Brooks et al.

OTHER PUBLICATIONS

Office Action for U.S. Appl. No. 13/083,912, filed Apr. 11, 2011, Office Action mailed Jun. 18, 2013, 21 pages.
"Photo Higher Design History" received from a Third Party during licensing negotiations in Oct. 2012, 4 pages.
"KAPER: Digital Photography E-Resources", What's New, Reverse chronology of additions or changes to KAPER, http://www.kaper.us/NewKAP_R.html, printed Nov. 20, 2012, 14 pages.
Printed from http://web.archive.org/web/20010126202l/http:/www.seattlerobotics.org/encoder/200010/servohac.htm printed on Nov. 20, 2012, 1 page.
"RunRyder: Helicopters", Aerial Photography and Video: My Rig—cam mount, http://rc.runryder.com/helicopter/t47322p1/, printed Nov. 26, 2012, 7 pages.
"KAPER: Digital Photography E-Resources", Basics/Camera Cradle/360 Servo Conversions, Method 2—Geared External Pot, http://www.kaper.us/basics/BAS-360_2_R.html, printed Nov. 20, 2012,2 pages.
"RunRyder: Helicopters", Aerial Photography and Video: My First Camera Mount, http://rc.runryder.com/helicopter/t55545p1/, printed Nov. 20, 2012, 1 page.
"RunRyder: Helicopters", Aerial Photography and Video: Front mount side frame contest, http://rc.runryder.com/helicopter/t144518p1/, printed Nov. 26, 2012, 6 pages.
"RunRyder: Helicopters", Aerial Photography and Video: My current camera mount, http://rc.runryder.com/helicopter/t135298p1/, printed Nov. 26, 2012, 5 pages.
"RunRyder: Helicopters", Aerial Photography and Video: My new camera mount development, http://rc.runryder.com/helicopter/t137031p1/, printed Nov. 26, 2012, 7 pages.
"RunRyder: Helicopters", Aerial Photography and Video: Injection moulded Camera Mount, http://rc.runryder.com/helicopter/t178271p1/, printed Nov. 20, 2012,4 pages.
U.S. Appl. No. 13/655,883, filed Oct. 19, 2012, 22 pages.
U.S. Appl. No. 13/593,724, filed Aug. 24, 2012, 33 pages.
U.S. Appl. No. 13/616,316, filed Sep. 14, 2012, 18 pages.
Prosecution History for U.S. Appl. No. 13/083,912 including: Issue Notification dated Jul. 9, 2014, Notice of Allowance dated May 28, 2014, Amendment with RCE dated Apr. 15, 2014, Applicant Initiated Interview Summary dated Apr. 11, 2014, Advisory Action dated Apr. 2, 2014, Amendment after Final dated Mar. 27, 2014, Final Office

(56) References Cited

OTHER PUBLICATIONS

Action dated Feb. 3, 2014, Amendment dated Nov. 18, 2013, Non-Final Office Action dated Jun. 18, 2013, Application and Drawings filed Apr. 11, 2011, 146 pages.

Issue Notification for U.S. Appl. No. 13/655,883 dated Jul. 9, 2014, 1 page.

Prosecution History for U.S. Appl. No. 13/593,724 including: Issue Notification dated Aug. 6, 2014 and Notice of Allowance dated Jun. 25, 2014, 10 pages.

Prosecution History for U.S. Appl. No. 13/655,883, filed Oct. 19, 2012, including Application Filed Oct. 19, 2012, Non-Final Office Action issued Apr. 3, 2014, Response filed Apr. 21, 2014, and Notice of Allowance Issued May 28, 2014, 42 pages.

Prosecution History of U.S. Appl. No. 13/593,724, filed Aug. 24, 2012, including Application Filed Aug. 24, 2012, Non-Final Office Action Issued May 23, 2014, and Response filed Jun. 10, 2014, 56 pages.

Jeremy Cook, Servo City and off-the-shelf Servo Brackets, Sep. 14, 2011, JCoPro.net, 2 pages.

Prosecution History for U.S. Appl. No. 14/332,857 including: Amendment dated Dec. 21, 2015, Non-Final Office Action dated Nov. 16, 2015, Preliminary Amendment dated Aug. 21, 2014 and Application and Drawings filed Jul. 16, 2014, 77 pages.

* cited by examiner

CAMERA MOTION CONTROL SYSTEM WITH VARIABLE AUTONOMY

REFERENCE TO RELATED CASE

The present application is based on and claims the priority of provisional application Ser. No. 61/495,569 filed on Jun. 10, 2011, the content of which is hereby incorporated by reference in its entirety.

BACKGROUND

Cameras typically include a limited field of view. In many situations, it is desirable to change the physical positioning of the camera so as to extend and/or change the field of view. Electromechanical camera motion control systems are used to physically adjust the positioning of the camera at least for this purpose.

An electromechanical camera motion control system will often incorporate a multichannel controller. For example, a multichannel controller can be used to control a pan-and-tilt camera motion control mechanism. In this case, one channel of the multichannel controller is used to control a pan motion of the mechanism based on user input, and another channel is used to control tilt motion also based on user input. In the case of a pan-tilt-and-roll camera motion control mechanism, a third channel is added to enable user control of roll motion.

Many known camera motion control systems provide a multichannel control scheme wherein the user selects desired camera motion by manipulating physical joysticks, sliders, knobs, or some other mechanical input device. These mechanical inputs are translated into electronic motion control signals that are directed through the various channels, thereby effectuating corresponding changes to the physical positioning of the camera motion control mechanism and therefore changes to the physical positioning of the camera itself. Unfortunately, the provided mechanical user input mechanisms are typically not very flexible in terms of providing the user with selectively configurable motion control options.

SUMMARY

An aspect of the disclosure relates to variable autonomy control systems. In one embodiment, a control system includes an analog communications support component, a digital communications support component, a processing component, and a motor controller. The processing component synthesizes inputs received from the analog and the digital communications support components to generate an output. The motor controller utilizes the output from the processing component to generate a control signal for a motor. In certain embodiments, the input from the digital communications support component includes an indication of an autonomy level, and the processing component synthesizes the inputs by applying the autonomy level to the input received from the analog communications support component.

These and various other features and advantages that characterize the claimed embodiments will become apparent upon reading the following detailed description and upon reviewing the associated drawings.

DETAILED DESCRIPTION

I. Camera Motion Control Mechanism

Figure 1:
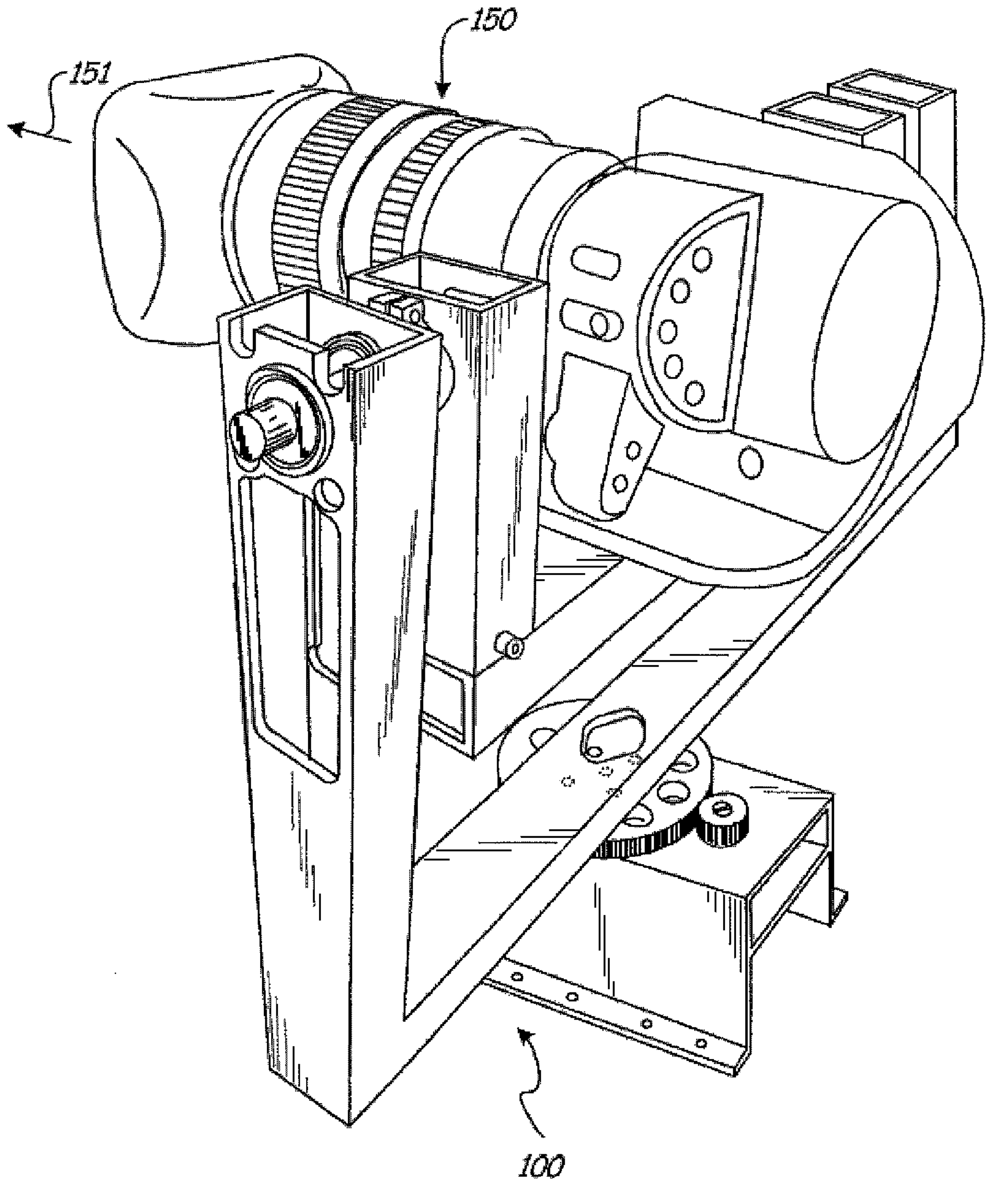
FIG. 1 is a perspective view of a pan and tilt system with an attached camera.

FIG. 1 is a perspective view of an illustrative camera motion control mechanism 100 with an attached camera 150. Mechanism 100 is a pan-and-tilt mechanism and, as such, is a two channel motion control mechanism (i.e. the mechanism is configured to pan and/or tilt camera 150). An arrow 151 represents the direction of the field of view of camera 150. Pan-and-tilt mechanism 100 is able to position camera 150 such that its field of view can be pointed to or directed at objects within the three dimensional space surrounding the camera.

It is to be understood that the scope of the present invention is not limited to a pan-and-tilt motion control mechanism. The concepts described herein could just as easily be applied to a different type of camera motion control mechanism having any number of channels and corresponding ranges of motion. For example, the concepts described herein could just as easily be applied to mechanisms including, but not limited to, a pan-tilt-and-roll mechanism (three channels and ranges of motion), a simple cable cam mechanism (one channel and range of motion), or a cable cam mechanism with an integrated pan-tilt-and-roll mechanism (four channels and ranges of motion). The pan-and-tilt mechanism 100 is provided herein as a specific example for illustrative purposes only.

Further, FIG. 1 shows camera 150 as a relatively large video camera. The concepts described herein could just as easily be applied to camera motion control mechanisms configured to support and position any type or size of camera such as but not limited to photographic cameras, digital video cameras, webcams, DSLR, and CCD cameras. The supported camera could be any size or shape including cameras weighing an ounce or less all the way up to cameras weighing up to one hundred and fifty pounds or more.

Still further, it is to be understood that the scope of the present invention is not even necessarily limited to a camera motion control system per se. Those skilled in the art will appreciate that, instead of a camera, any other device could be attached to the types of motion control systems described herein and moved in the same manner as a camera is moved. For example, not by limitation, a spotlight, a colored light, a laser, sensor, a solar panel, a robot head, or anything else can be moved around within the motion control system.

Figure 2:
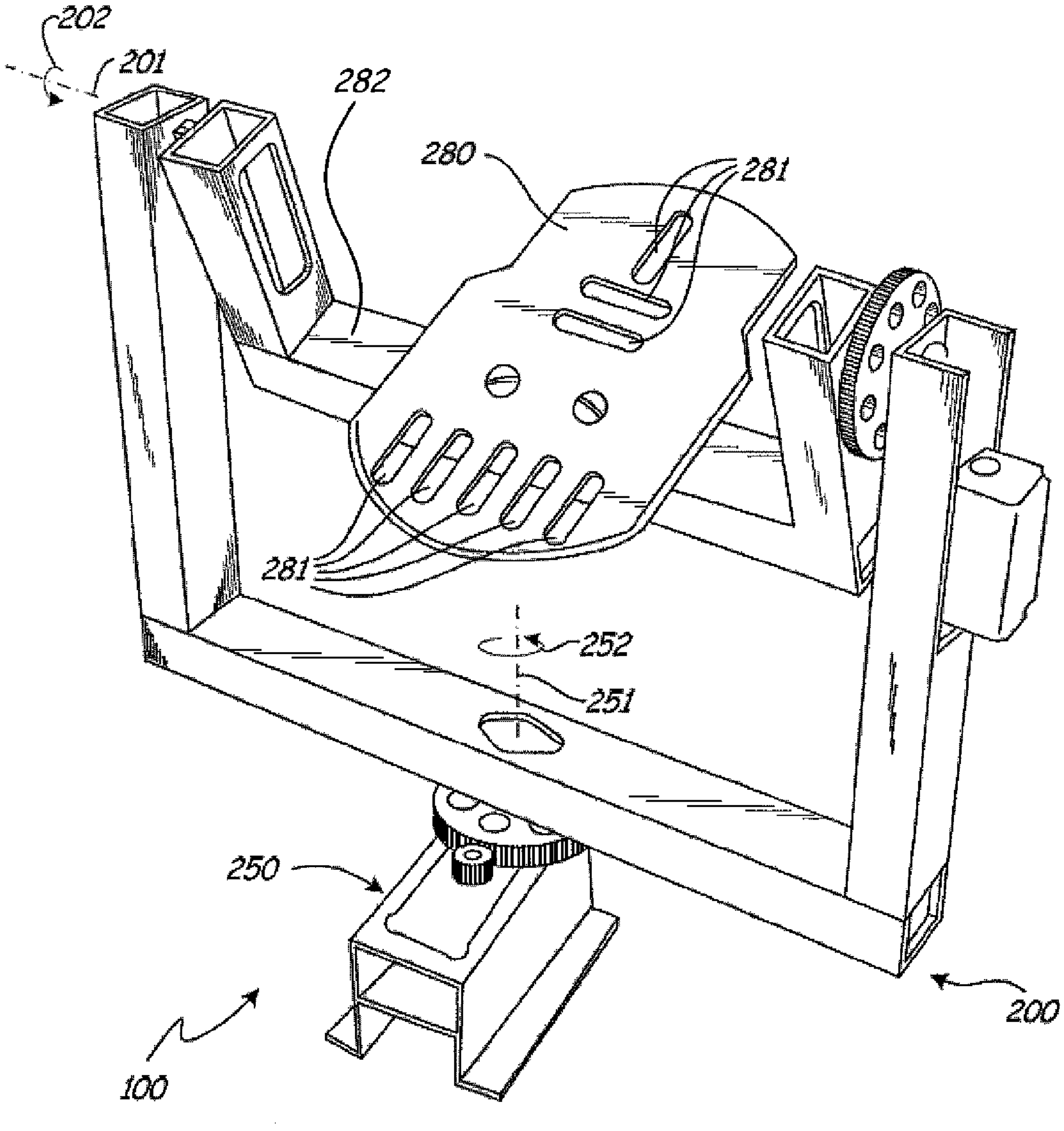
FIG. 2 is a perspective view of a pan and tilt system without an attached camera.

FIG. 2 is a perspective view of an embodiment of pan-and-tilt mechanism 100 by itself (i.e. with camera 150 removed). Mechanism 100 includes a camera mounting plate 280. Plate 280 optionally includes slots or apertures 281. Apertures 281 are used to attach and position various types of cameras to pan and tilt system 100. Embodiments of camera mounting plate 280 illustratively include features such as, but not limited to, clamps, hooks, bolts, and apertures/slots of all sizes and shapes that are used to attach or secure a camera to mechanism 100. Alternatively, in an embodiment, pan-and-tilt mechanism 100 does not include a mounting plate 280 and a camera is directly attached to or secured to bar 282.

As can be seen in FIG. 2, mechanism 100 illustratively includes a tilt sub-system 200 and a pan sub-system 250. Tilt sub-system 200 includes a tilt axis of rotation 201. Tilt sub-system 200 includes components that are able to rotate an attached camera about axis 201 in the direction shown by arrow 202 and in the direction opposite of that shown by arrow 202. Pan sub-system 250 includes a pan axis of rotation 251. Pan sub-system 250 includes components that are able to rotate an attached camera about axis 251 in the direction shown by arrow 252 and in the direction opposite of that shown by arrow 252.

II. Camera Motion Control System

Figure 3:
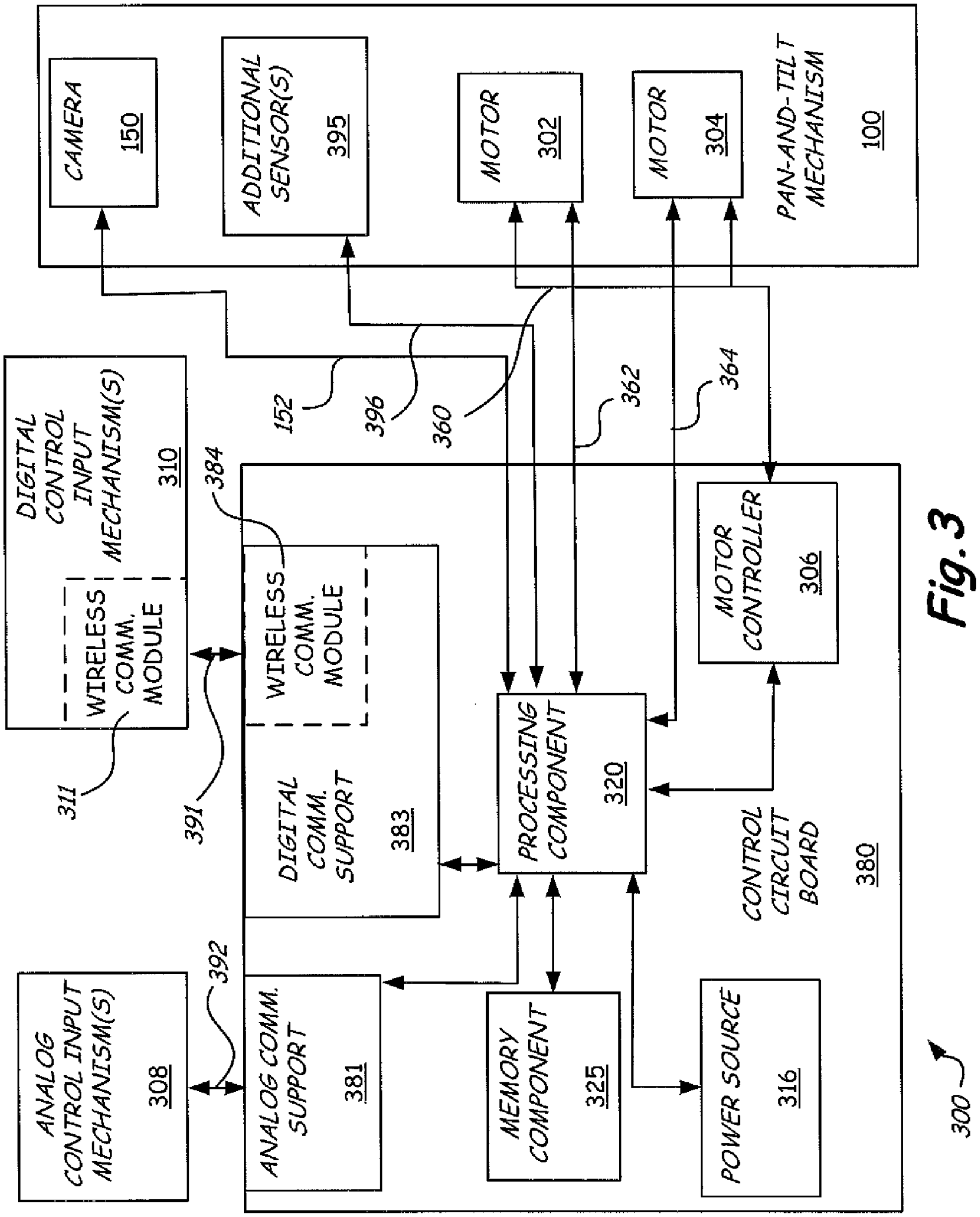
FIG. 3 is a block diagram of a camera motion control system.

FIG. 3 is a schematic diagram of a camera motion control system 300 that illustratively includes pan-and-tilt mechanism 100 and camera 150, as shown and described in relation to FIGS. 1 and 2. In FIG. 3, pan-and-tilt mechanism 100 is shown as including motors 302 and 304. Motor 302 is illustratively part of tilt sub-system 200 in that motor 302 is the mechanical drive for rotating camera 150 about axis 201 as previously described. Motor 304 is illustratively part of pan sub-system 250 in that motor 304 is the mechanical drive for rotating camera 150 about axis 251 as previously described.

Just as the scope of the present invention is not limited to the mechanism and camera shown in FIGS. 1 and 2, it is also not limited to the exact configuration of the motion control system shown in FIG. 3. Other similar configurations are certainly to be considered within the scope. For example, system 300 includes a plurality of functional components communicatively connected to one another, as well as to other components in the system, by way of a circuit implemented in relation to a circuit board 380. Those skilled in the art will appreciate that FIG. 3 is schematic and simplified in that other components may be included in a fully functional system, and functional components shown as being separate elements may actually be merged into a single component integrated upon the board 380. Further, the particular connections (e.g. the arrows, etc.) shown between elements is illustratively only and should not be construed as limiting in any way. The components can be communicatively connected to one another in any way without departing from the scope of the present invention.

As is indicated by arrow 360, a motor controller 306 illustratively provides signals to motors 302 and 304. These signals, which are for the purpose of controlling the motors, are provided by any known means including but not limited to changes in current, voltage variations, pulse width modulation signals, etc. Notably, controller 306 is at least a two channel control but is illustratively but not necessarily equipped with additional unused control channels. For example, a roll motion control device could be added to mechanism 100 and one of the unused control channels could be utilized to control the motor responsible for the roll motion.

By providing the signals to motors 302 and 304, the controller 306 initiates changes in the mechanical output of the motors, thereby causing corresponding changes in the rotation of camera 150 around axis 201 and/or axis 251. Controller 306 is therefore configured to start, stop, change the speed of, reverse, or otherwise affect rotation of the camera about the axes 201 and 251. Those skilled in the art will appreciate that controller 306 can be simple or complex in terms of the precise set of functions that it provides. The controller can be, in one embodiment, configured for more sophisticated management functions such as but not limited to regulation of the speed of rotation, regulation or limiting of the torque of the motors, protection against overloads and faults, etc. The scope of the present invention is not limited to any one particular controller or precise set of functions performed by the controller.

Further, those skilled in the art will appreciate that motor controller 306 will include a connection to a power source 316 (e.g. a battery pack or power supply). Controller 306 may also included integrated control circuitry that processes analog or digital input signals from one or more input mechanisms (e.g. analog input mechanism(s) 308 and/or digital input mechanism(s) 310) for use as a basis for controlling motors 302 and 304. In one embodiment, as is reflected in FIG. 3, analog communications support component 381 optionally manages the receipt of analog input from an analog control mechanism 308 (e.g. a joystick) and provides it to a processing component 320. Similarly, in one embodiment, digital communications support component 383 manages the receipt of digital input from a digital control mechanism 310 (e.g. a smartphone, a tablet computer, a handheld computer, notebook, netbook, PC, etc.) and provides it to processing component 320. Processing unit 320 is not limited to any particular computing device but is illustratively in the nature of, but not by limitation, a microcontroller, a small computing system running software, a firmware chip, etc. Depending upon the nature of input mechanisms 308 and 310, the control signals may be provided on a manual (e.g. user-initiated), automatic, and/or semi-automatic basis. The processing component synthesizes the received inputs and generates a corresponding output to motor controller 306. The motors 302 and 304 are illustratively controlled by device 306 based at least in part upon the analog and/or digital signals received from the input mechanism(s) 308 and 310.

In one embodiment, processing component 320 is configured to also factor feedback 362 and 364 into the selection of motor control commands provided to motor controller 306. Alternatively, the motor controller can be configured to adjust motor commands itself (e.g. based on a feedback signal received directly rather than being channeled through component 320). It is within the scope of the present invention, in terms of feedback, for system 300 to be closed loop or open loop depending upon the requirements of a given implementation or control scheme.

In one embodiment, motors 302 and 304 are hobby servo motors each having an internal potentiometer (e.g. a small potentiometer functionally integrated within the motor casing) from which controller 306 and/or processing component 320 receives positional feedback data that is factored into the control of motors 302 and 304. In another embodiment; however, motor 302 and/or motor 304 does not include its own integrated internal feedback mechanism, but instead a feedback mechanism (e.g. an external potentiometer, an encoder, etc.) is attached to a component driven by the motor. In this case, it is the external feedback mechanism that provides the feedback data 362 and 364 to be factored into the motor control scheme. For example, in one embodiment, a potentiometer is connected to a shaft that is rotated (e.g. by way of a geared, belt-driven, or sprocket driven mechanical relationship) whenever an output shaft of the motor is rotated. This external feedback signal is factored into the subsequent control signals provided to the motor.

As shown in FIG. 3, digital control input mechanism(s) 310 and digital communications support 383 optionally include wireless communications modules 311 and 384 that enable mechanism(s) 310 and support 383 to communicate with each other through a wireless connection 391. In one embodiment, modules 311 and 384 are utilized in establishing an ad-hoc wireless network (e.g. an ad-hoc WiFi network) between the devices. The ad-hoc network enables mechanism(s) 310 and support 383 to be able to discover each other and directly communicate in a peer-to-peer fashion without involving a central access point (e.g. a router). System 300 is not however limited to systems that include an ad-hoc network between mechanism(s) 310 and support 383. In other embodiments, mechanism(s) 310 and support 383 communicate indirectly using a central access point (e.g. a router) or communicate directly through a wired connection. Embodiments are not however limited to any particular configuration. Additionally, the connections between the other devices (e.g. connections 152, 392, 360, 362, 364, 396) may optionally be either wireless connections or wired connections, and system 300 may include any additional components needed to establish such connections.

FIG. 3 shows that system 300 may also include one or more additional sensor(s) 395 that optionally provide signals (e.g. feedback) to processing component 320 through connection 396, which again may be one or more wireless connections, wired connections, or a combination of wireless and wired connections. Some examples of additional sensor(s) 395 that may be included within system 300 include a motion sensor (e.g. an accelerometer), a light sensor, a proximity sensor, a GPS receiver, a temperature sensor (e.g. a thermocouple), a biometric sensor, an RFID reader, a barcode scanner, and a photographic or video camera. In an embodiment, processing component 320 utilizes signals from sensor(s) 395 and/or signals from camera 150 in generating the output to motor controller 306. For instance, controller 320 illustratively receives GPS, proximity, and/or motion information from sensor(s) 395 and utilizes that information in controlling the positioning of pan-and-tilt mechanism 100. Also for instance, controller 320 may receive video from camera 150 or sensor(s) 395 and utilize the video in positioning mechanism 100. Controller 320 could for example use the video in performing fully automated object tracking. Controller 320 could also for example output the video to digital control input mechanism(s) 310 where the video could be viewed by a user.

Finally with respect to FIG. 3, control circuit board 380 may optionally include a memory component 325 that is communicatively coupled to processing component 320. Memory component 325 is illustratively volatile memory (e.g. DRAM or SRAM) or non-volatile memory (e.g. flash memory, EEPROM, hard disc drive, optical drive, etc.). In one embodiment, memory component 325 is integrated with processing component 320 (e.g. cache on a microprocessor). Memory component 325 is able to send and receive information to and from other components within system 300, and is also able to store instructions, parameters, configurations, etc. that can be retrieved and utilized by processing component 320 in generating output to motor controller 306.

Figure 4:
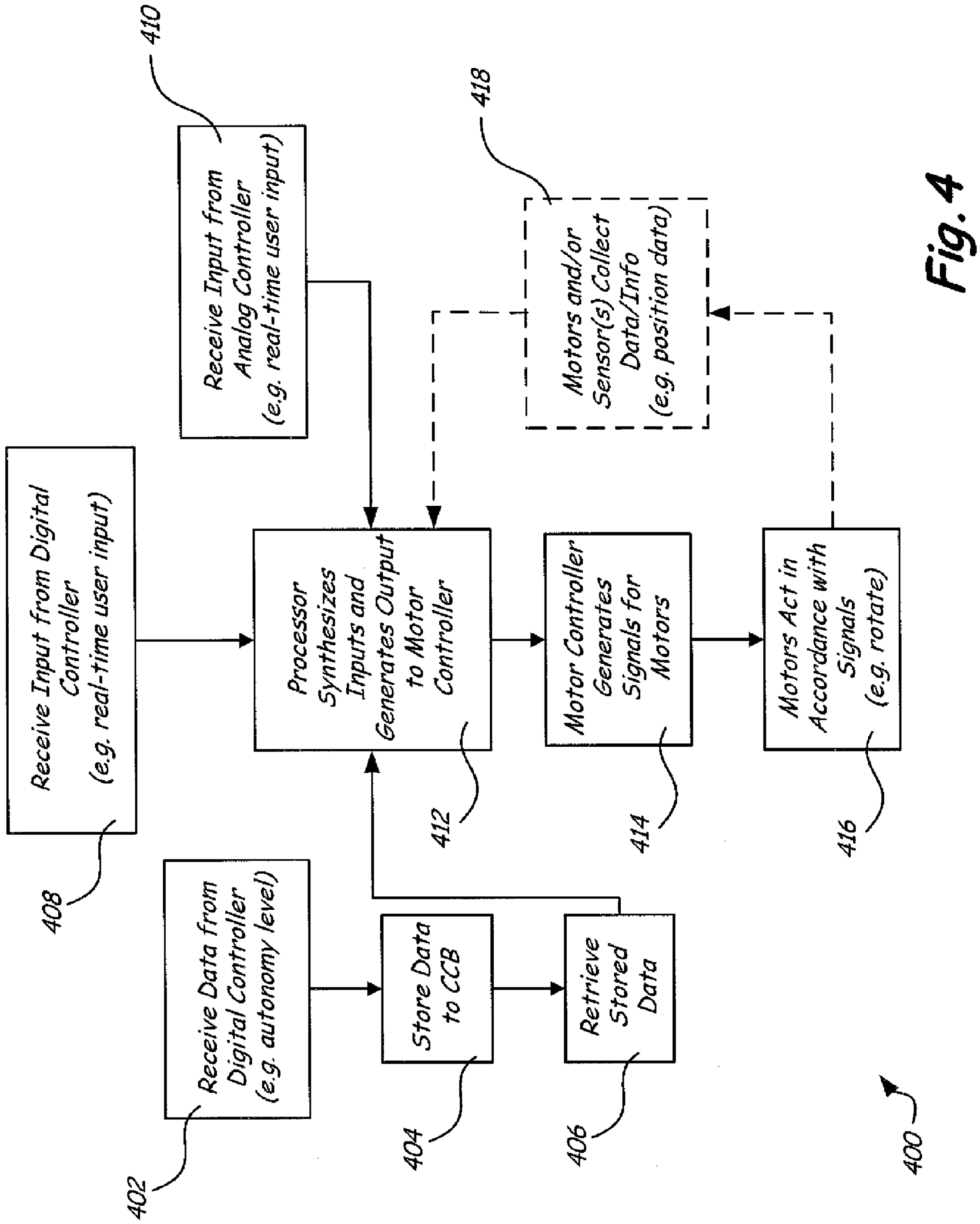
FIG. 4 is a process flow diagram of a method of operating a camera motion control system.

FIG. 4 is a process flow diagram of an example of one method that can be implemented utilizing a system such as, but not limited to, system 300 shown in FIG. 3. At block 402, information or data from a digital control input mechanism(s) is received. Some examples of information include settings, configurations, applications, a control mode selection, and an autonomy level. The information is not however limited to any particular information and can include any information. At block 404, the received information or data is stored by a control circuit board. For instance, the information could be stored to a memory component such as memory component 325 shown in FIG. 3. At block 406, the stored information or data is retrieved by or sent to a processing component such as processing component 320 in FIG. 3. In one embodiment, the information or data is stored to a memory portion of a processing unit (e.g. a cache portion of the processing unit) and is then retrieved by a logic portion of the processing unit that utilizes the information in generating a motor controller output.

At block 408, an input from a digital control input mechanism(s) is received. In an embodiment, the input received at block 408 is a real-time user input. For instance, a user could be using the digital control input mechanism(s) as a controller for a pan-and-tilt system, and the input includes an indication from the user for the pan-and-tilt system to rotate one or both of the motors. Also for instance, the input could include an indication from a user to switch a control mode of the pan-and-tilt system. A user could for example switch control of the pan-and-tilt system from being controlled by an analog control input mechanism to being controlled by a digital control input mechanism, or vice versa. A user could also switch the autonomy level of a control mode (e.g. from manual control to semi-autonomous or fully autonomous control).

At block 410, an input from an analog control input mechanism(s) is received. In an embodiment, the input received at block 410 is a real-time user input. For instance, a user could be using the analog control input mechanism(s) as a controller for a pan-and-tilt system, and the input includes an indication from the user for the pan-and-tilt system to rotate one or both of the motors. The analog control input mechanism(s)

could be for example a joystick, and the input would include an indication of left/right or up/down motion of the joystick.

At block 412, a processor such as processing component 320 in FIG. 3 synthesizes the multiple inputs that it receives and generates output that is sent to a motor controller such as motor controller 306 in FIG. 3. In one embodiment, a pan-and-tilt system is in an analog control mode, and the processor receives an indication of a movement from an analog control input mechanism (e.g. a joystick). In such a case, the processor then retrieves setting or configuration information and applies the information to the indication of movement to generate output for a motor controller. For example, the stored information could include information indicative of a sensitivity setting or a maximum rotation speed setting, and the processor applies that information to a joystick movement to generate output for a motor controller. The processor could similarly apply setting or configuration information to an input received from a digital control input mechanism (e.g. a smart phone). In another embodiment, both a digital and an analog input control mechanism are being utilized to control channels of a system, and the processor synthesizes the inputs to generate output for a motor controller. Additionally, as is discussed in greater detail below, feedback or other information may be collected by motors and/or sensors, and that feedback or other information can be sent to the processor and synthesized with other information. It should be noted that the synthesis performed at block 412 is not limited to any particular combination of inputs. The synthesis could involve only one input, or could involve any combination of the various inputs. For instance, in a fully automated control mode, a processor may only receive inputs from information or data stored in a control circuit board (e.g. blocks 404/406) and information from sensors (e.g. block 418). Alternatively, in a manual control mode, a processor may only receive input from either a digital controller (e.g. block 408) or from an analog controller (e.g. block 410).

At block 414, the motor controller receives the output from the processor, and utilizes that output in generating one or more signals that are sent to the motors of a system. These signals, which are for the purpose of controlling the motors, are provided by any known means including but not limited to changes in current, voltage variations, pulse width modulation signals, etc. At block 416, one or more motors (e.g. pan, tilt, roll, and/or zoom motors) are actuated in accordance with the signals received from the motor controller. For instance, the signals could indicate a particular position or rotation at a certain speed, and the motors move to that position or rotate at that speed.

At block 418, motors of a system and/or sensor(s) associated with a system collect or otherwise generate data or information, which is sent back to the processing unit to be optionally incorporated in its synthesis. For example, the motors could be part of a closed-loop servo system, and the feedback would indicate positions of the motors. Alternatively, the system could be in a fully-autonomous motion tracking mode, and the feedback could include video from one or more cameras that is utilized in tracking the motion of an object. In yet another embodiment, the information includes GPS information from a GPS receiver that is utilized by the processor in controlling a position of a pan-and-tilt system. The feedback/information collected or generated at block 418 is not limited to any particular type of feedback/information and includes any type or combination of feedback/information.

Figure 5:
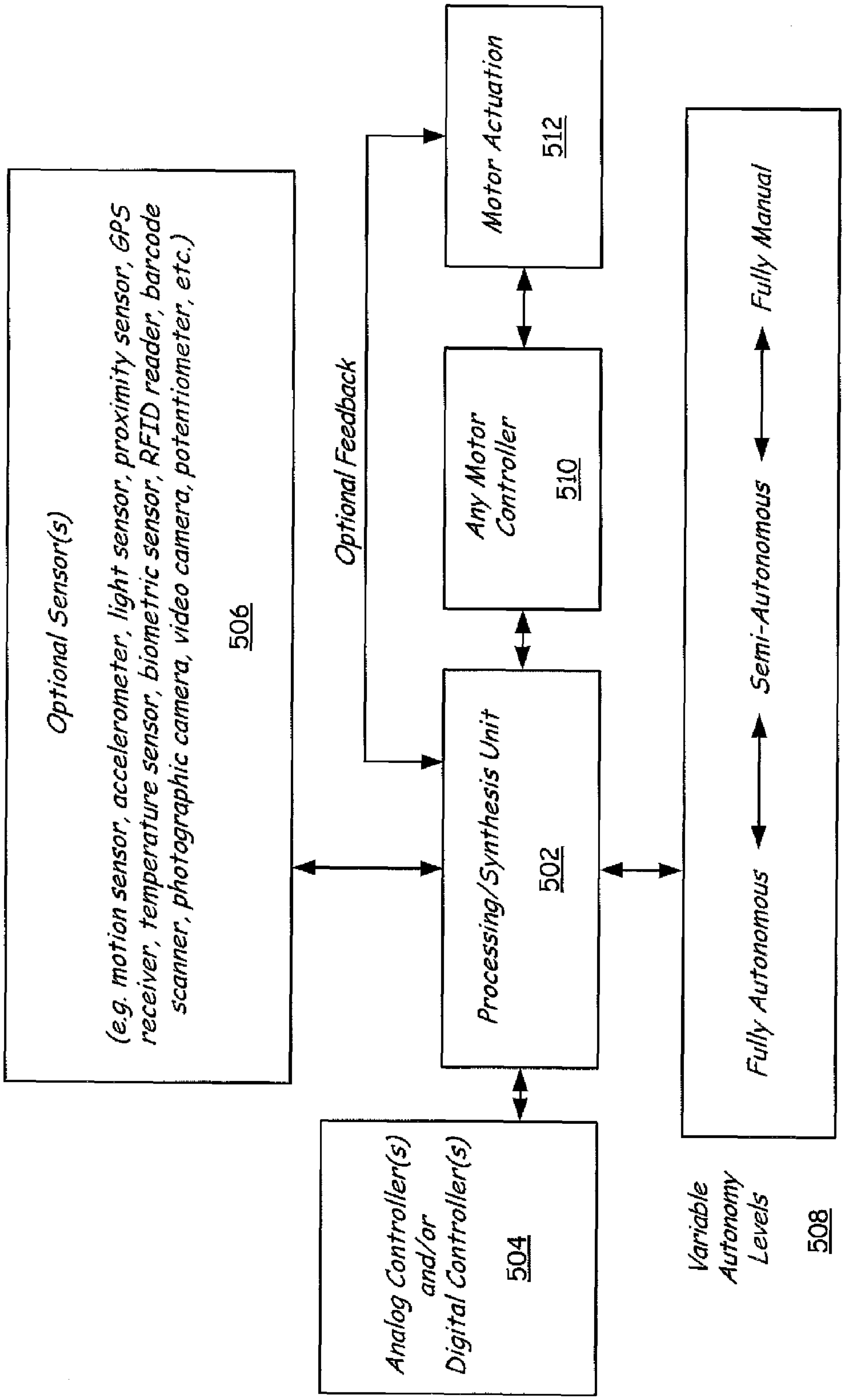
FIG. 5 is a schematic diagram of a variable autonomy level control system.

FIG. 5 is a block diagram of another embodiment of a variable autonomy system that can be implemented in a pan-and-tilt system or in any other system. The system includes a processing/synthesis unit 502 that receives input from analog and/or digital controllers 504 and/or from optional sensor(s) 506. Again, sensor(s) 506 can include any type or combination of one or more sensors. Some examples of sensors include, but are not limited to, motion sensors, accelerometers, light sensors, proximity sensors, GPS receivers, temperature sensors, biometric sensors, RFID readers, barcode scanners, photographic cameras, video cameras, potentiometers, etc. Also, analog controller(s) and digital controller(s) can also include any type or combination of one or more controllers (e.g. joysticks, trackballs, smart phones, tablet computers, etc.).

Processing/synthesis unit 502 also receives an indication of an autonomy level 508. The system illustratively includes a spectrum of autonomy levels from fully autonomous operation (e.g. automated motion tracking) to fully manual operation (e.g. joystick operation). Although the figure only shows one semi-autonomous level, the system can include any number of semi-autonomous levels between fully autonomous and fully manual operations. Additionally, the figure shows arrows between the autonomy levels indicating that the system can switch between autonomy levels during operation. The system is illustratively able to switch to go from any one autonomy level to another. For instance, the system could go from fully manual operation directly to fully autonomous operation. Also, the indication of autonomy level 508 is illustratively received from controller(s) 504 and stored to a memory component associated with the processing/synthesis unit 502. However, embodiments are not limited to any particular configuration and include any devices or methods necessary for receiving an indication of an autonomy level.

Processing/synthesis unit 502 generates an output that is transmitted to a motor controller 510. In an embodiment, motor controller 510 can include any various type or configuration of motor controller, and processing/synthesis unit 502 is able to generate output that is in a correct format/protocol for the motor controller 510 to process. Accordingly, the variable autonomy level system can be used with any motor controller 510. The motor controller 510 processes the output that it receives and generates one or more signals that cause an actuation (e.g. rotation) of one or more motors 512. As shown in the figure, the motors optionally generate feedback that is transmitted to the processing/synthesis unit 502. The optional feedback is illustratively combined or otherwise synthesized with the other inputs 504, 506, and 508 to generate output for the motor controller 510.

Figure 6:
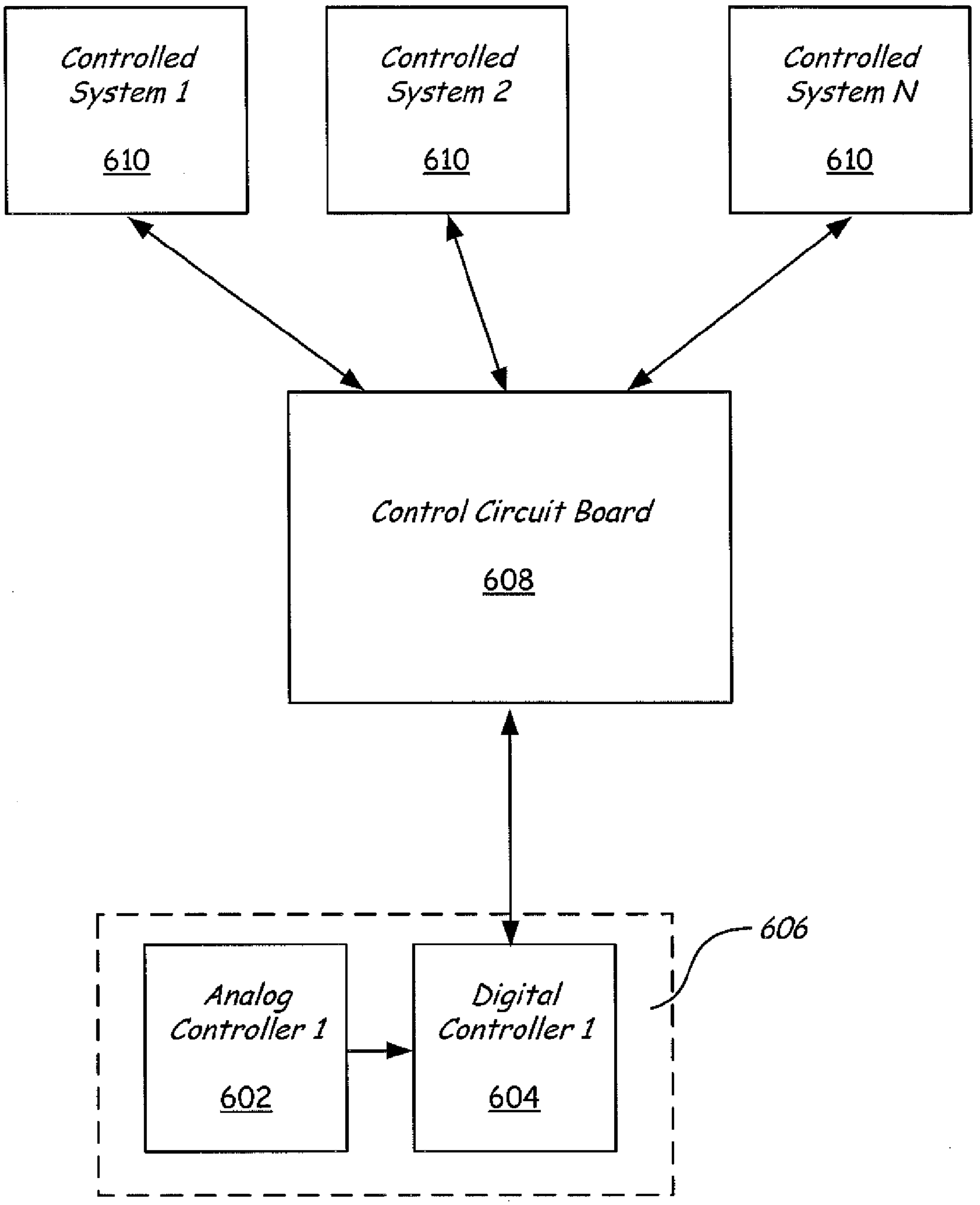
FIG. 6 is a schematic diagram of a set of controllers controlling multiple systems.

FIG. 6 is a block diagram of yet another embodiment of a variable autonomy system. In the particular embodiment shown in the figure, the system only includes one analog controller 602 and one digital controller 604. In other embodiments, systems may include any number and combination of analog and/or digital controllers. Analog controller 602 and digital controller 604 are illustratively combined together as one physical unit 606. For example, analog controller 602 illustratively includes a slot in which the digital controller 604 can be fit within and be securely held in place.

Digital controller 604 is illustratively communicatively coupled to control circuit board 608 utilizing either a wired or a wireless (e.g. ad-hoc WiFi network) connection. In one embodiment, analog controller 602 is directly communicatively coupled to digital controller 606 and not to control circuit board 608. In such a case, inputs from analog controller 602 are indirectly communicated to control circuit board 608 utilizing digital controller 604. Embodiments are not however limited to any particular configuration, and analog controller 602 could in other embodiments be directly communicatively coupled to control circuit board 608.

Control circuit board 608 receives user inputs or other information/data from digital controller 604 and/or analog controller 602, and utilizes those inputs to generate signals for controlling controlled systems 610. Controlled systems 610 are not limited to any particular type of system and include any systems. Some examples of controlled systems 610 include, for illustration purposes only and not by limitation, pan-and-tilt systems, pan-tilt-and-roll systems, pan-tilt-roll-and-zoom systems, lighting systems, robots, laser systems, etc. For instance, each of the systems 610 shown in FIG. 6 could be different pan-and-tilt systems that are controlled by the one control circuit board 608 and the one set of analog and digital controllers 606. Accordingly, FIG. 6 shows an embodiment in which one set of controllers 606 is able to control multiple systems 610. It should be noted that the multiple systems 610 can be controlled at various autonomy levels. One system could for example be controlled in a fully autonomous mode, another in a semi-autonomous mode, and yet another in a fully manual mode. Embodiments illustratively include any number of systems 610 that are controlled in any combination of autonomy levels.

III. Cloud Computing Environment

Figure 7:
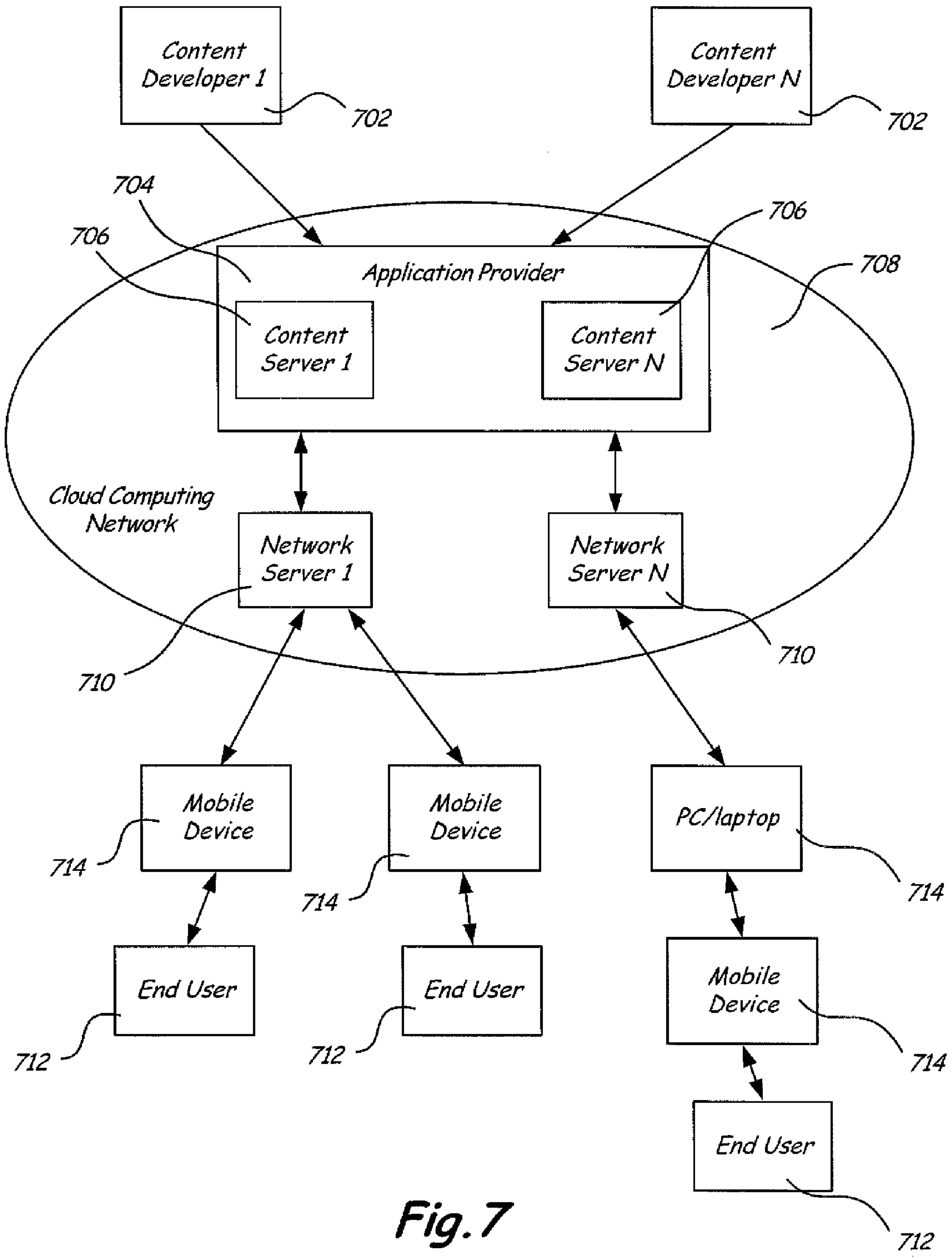
FIG. 7 is a schematic diagram of a cloud computing network.

FIG. 7 is a schematic diagram of a cloud computing environment 700 that is illustratively utilized in implementing certain embodiments of the present disclosure. As will be discussed in greater detail below, cloud computing environment 700 can be utilized in developing and distributing content such as, but not limited to, applications, extensions, and various other forms of computer executable instructions.

System 700 illustratively includes a plurality of content developers 702. The figure shows that there are N content developers 702, where N represents any number. In an embodiment, content developers 702 write or develop content (e.g. applications, extensions, other computer executable instructions, etc.). For example, a content developer 702 could write the code for a smart phone application that can be used to control a pan-and-tilt camera system. Content developers 702 upload or otherwise transmit their content to a content provider 704. Some examples of content providers include, for illustration purposes only and not by limitation, Apple's iTunes, Microsoft's Zune Marketplace, and Google's Android Market. Content provider 704 illustratively includes any number N of content servers 706. Content provider 704 utilizes content servers 706 in storing, receiving, and sending content. Content provider 704 and content servers 706 are optionally part of a cloud computing network 708. Cloud computing network 708 enables the on-demand provision of computational resources (e.g. data, software, other content, etc.) via a computer network, rather than from a local computer. Additionally, cloud computing network 708 provides computation, software, data access, storage services, other content, etc. that do not require end-user knowledge of the physical location and configuration of the system that delivers the services or content.

Content provider 704 is illustratively directly or indirectly communicatively coupled to any number N of network servers 710. Network servers 710 optionally include servers from any number and type of network. Some examples of networks include, but are not limited to, internet service providers, cellular phone services providers, mobile telecommunication providers (e.g. 3G or 4G services), and Wi-Fi networks. As shown in the figure, network servers 710 may optionally be partially or fully included within the cloud computing network 708.

End users 712 (e.g. people that are customers, businesses, government agencies, etc.) are illustratively able to communicate with the cloud computing network 708 by utilizing computing devices 714. In one embodiment, end users 712 communicate with cloud 708 by forming a direct or indirect communications link between their computing devices 714 and network servers 710. It should be mentioned that computing devices 714 include any type of computing device such as, but not limited to, a personal computer, a server, a laptop, a notebook, a netbook, a tablet, a personal digital assistant, a smart phone, a cellular phone, a music player (e.g. MP3 player), a portable gaming system, a console gaming system, etc. Additionally, computing devices 714 are optionally able to form a secure link or connection to network servers 710 utilizing encryption (e.g. SSL) or any other method. Accordingly, computing devices 714 are able to securely communicate private information (e.g. user names, addresses, passwords, credit card numbers, bank account numbers, etc.) to network servers 710 and/or content provider 704.

End users 712 are illustratively able to access (e.g. view, browse, download) applications or other content stored by content provider 704 through the direct or indirect communication links between computing devices 714, network servers 710, and content servers 706 discussed above. End users are also able to securely transmit private information to network servers 710 and/or content provider 704 using the same communication links. For example, an end user 712 could browse applications that are available for download from content provider 704. The end user 712 could then decide to buy one of the applications and securely submit his or her credit card information to content provider 704. Content provider 704 then verifies the credit card information (e.g. by performing an authorization or authentication process) and transmits the selected application to the end user 712 upon a successful verification.

Content provider 704 is illustratively able to provide any type or combination of types of access to end users 712. For instance, end users 712 can be provided with access to content stored by content provider 704 on a per use basis or on a subscription basis. In an example of a per use basis scenario, an end user 712 compensates (e.g. pays) content provider 704 for each item of content that he or she downloads. In an example of a subscription basis scenario, an end user 712 compensates content provider 704 a flat fee (e.g. a one-time payment or a series of periodic re-occurring payments) to have unlimited access (e.g. unlimited downloads) to all of or a portion of the content stored by content provider 704. In such a case or in any other case, the system shown in FIG. 7 may also include components needed to perform an authentication step to verify the identity of an end user 712. For instance, content provider 704 could store user names and passwords, and an end user would have to submit a valid user name and password to access content stored by content provider 704. Also for instance, content provider 704 could store biometric information (e.g. a finger print, facial scan, etc.), and an end user would have to submit a sample of valid biometric information. Embodiments are not limited to any particular method of performing end user 712 authentication and can include any authentication methods.

Finally with respect to FIG. 7, content provider 704 is also illustratively able to compensate content developers 702. The compensation to content developers can be on a flat fee basis, on a subscription basis, or on any other basis. For example, content provider 704 may compensate content developers 702 based on the amount and kind of content that each developer 702 uploads to the system. Also for example, content provider 704 may track the number of end user downloads that occur for each item of content stored by the system. The content provider 704 then compensates each developer 702 based on the number of end user downloads. Additionally, in an embodiment, a content developer 702 is able to specify or suggest an end user download price for each item of content that he or she uploads. The developer 702 illustratively charges end users 712 the specified or suggested price when they download the content. The content provider 704 then gives a portion of the revenue (e.g. 30%, 70%, etc.) to the content developer 702.

IV. Example of One Specific Implementation of a Variable Autonomy Digital Control Input Mechanism FIGS. 8-23 show examples of specific devices, user interfaces, etc. that are illustratively utilized in implementing a variable autonomy control system. It should be noted that the figures and accompanying descriptions are give for illustration purposes only, and that embodiments of the present disclosure are not limited to the specific examples shown in the figures.

Figure 8:
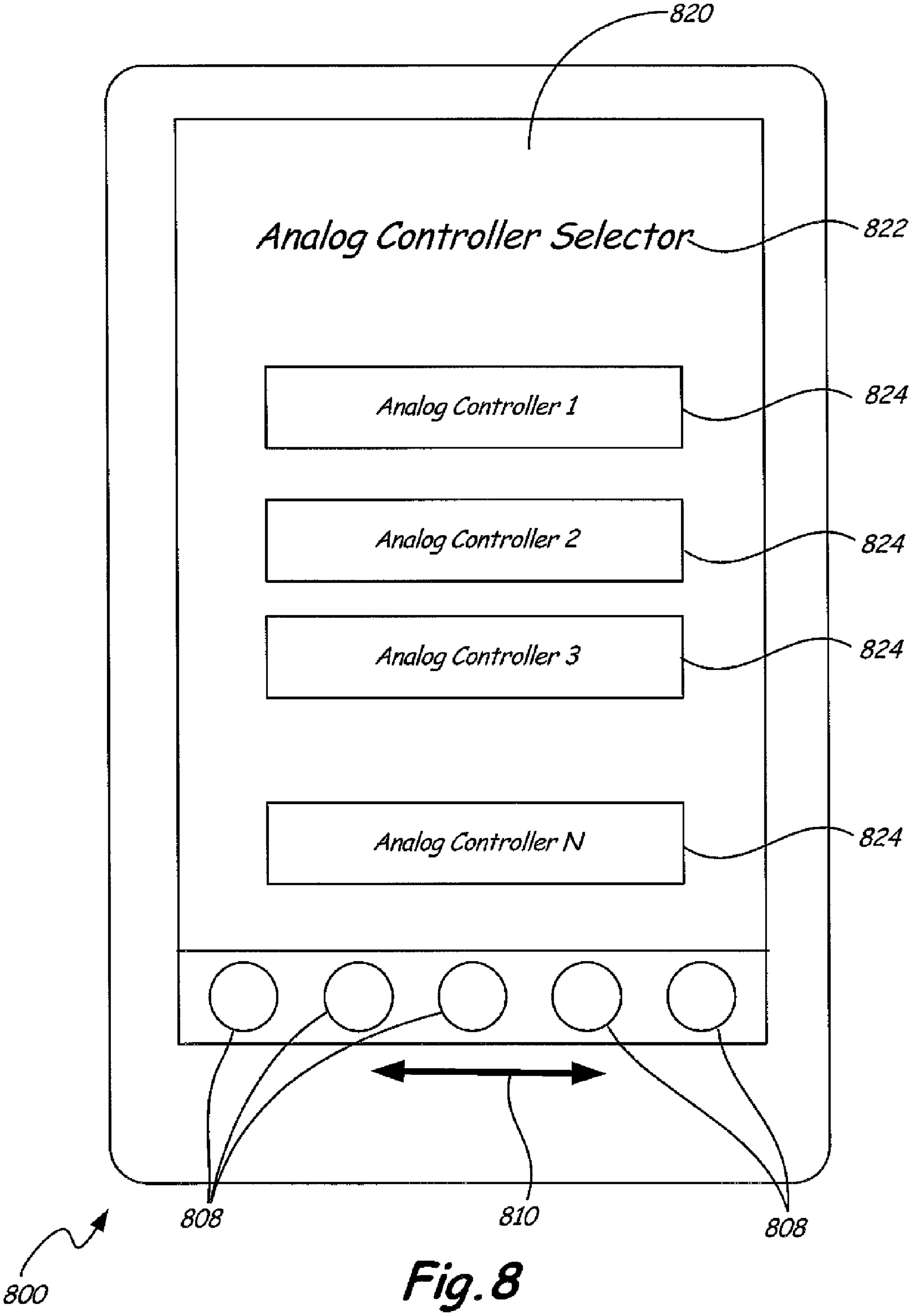
FIG. 8 is an example of one embodiment of an Analog Controller Selector user interface.

FIG. 8 shows a handheld device 800 that is illustratively utilized in implementing a digital control input mechanism. Handheld device 800 includes a touchscreen 802 that displays user interfaces of the digital control input mechanism. Each of the user interfaces optionally includes a main portion 804 and an icons portion 806 (e.g. a scrollable icons taskbar). Icons portion 806 includes icons 808. Each icon 808 is illustratively associated with a task, an application, etc. such that selection of the icon starts-up or launches the associated task, application, etc. Icons portion 806 may include more icons 808 than can be shown in icons portion 806. In such a case, a user can scroll the icons to the left or right to view additional icons. For instance, in the example shown in FIG. 8, only five icons 808 are shown in icons portion 806. A user can view icons to the left of the five icons 808 by touching any part of icons portion 806 and moving it to the right. Similarly, a user can view icons to the right of the five icons 808 by touching any part of icons portion 806 and moving it to the left. The left and right motion capability of icons portion 806 is represented by arrow 810.

One of the icons 808 is illustratively an Analog Controller Selector icon. Upon the Analog Controller Selector icon being selected (e.g. by being touched), an Analog Controller Selector interface 820 is displayed in the main portion 804 of the touchscreen 802. Interface 820 includes a title or header section 822 and any number N of user selectable controller selection buttons 824. Title or header section 822 identifies the current user interface being displayed (e.g. the Analog Controller Selector interface). Controller selection buttons 824 represent different analog control input mechanisms that may be used in a system such as, but not limited to, motion control system 300 shown in FIG. 3. In an embodiment, buttons 824 are user-configurable such that a user can edit the names/descriptions shown by the buttons. For example, a user could edit interface 820 such that buttons 824 display names such as Atari 2600 Joystick, PS3 Dualshock, Flight Simulator Joystick, Trackball, etc. Upon selection of one of buttons 824, a user is illustratively able to configure or adjust settings and other parameters associated with the selected control input mechanism.

Figure 9:
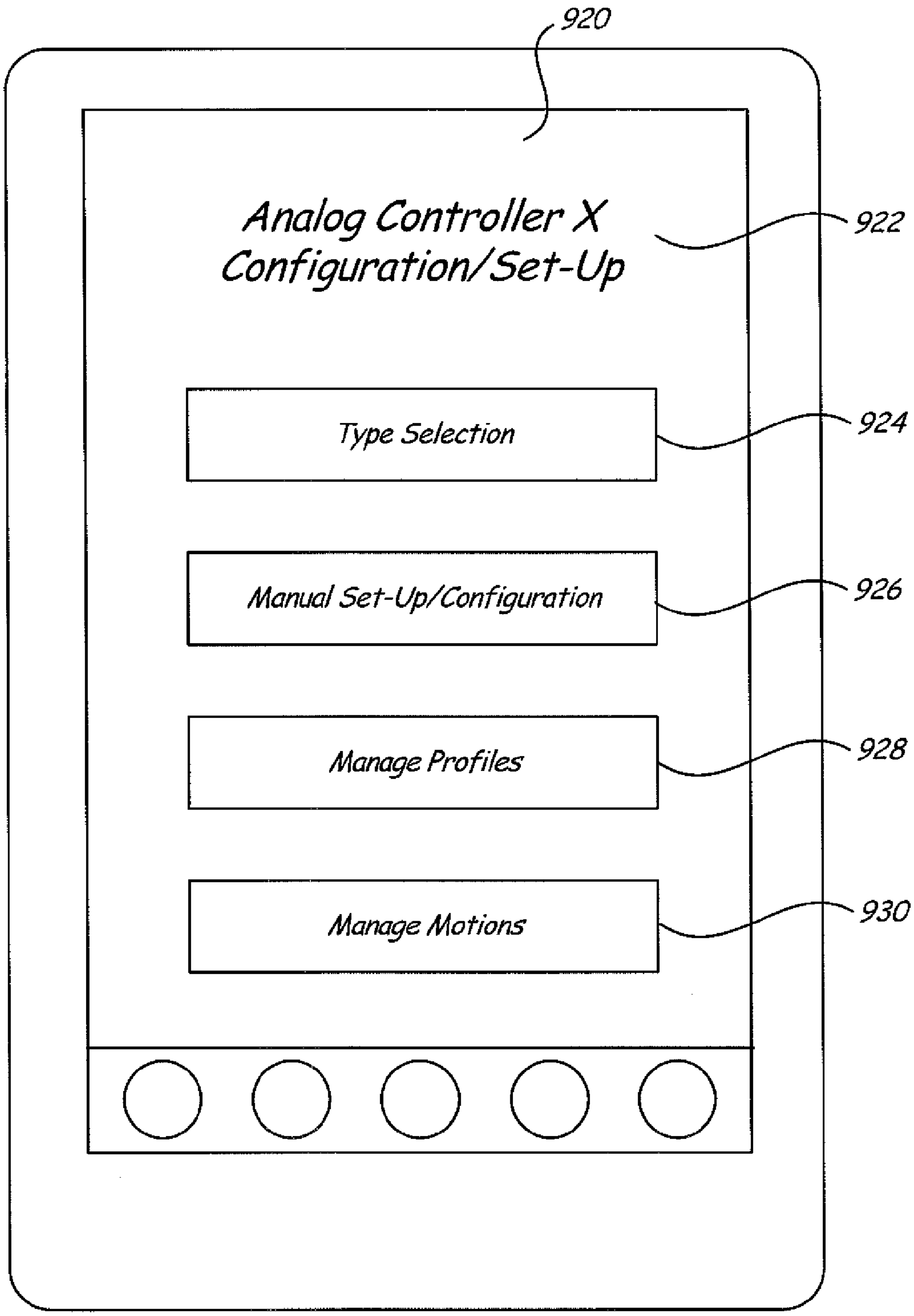
FIG. 9 is an example of one embodiment of an Analog Controller Configuration user interface.

FIG. 9 shows an example of an Analog Controller Configuration/Set-up interface 920. Interface 920 is illustratively displayed after one of the controller selection buttons 824 in FIG. 8 is selected. Interface 920 includes a title or header section 922 that identifies the current user interface being displayed and/or the associated controller. The example in FIG. 9 shows "X" where "X" represents any of the controllers that are selectable in the FIG. 8 interface (e.g. Analog Controller 1, 2, 3, etc.). Interface 920 also includes a number of user-selectable buttons 924, 926, 928, and 930 that enable a user to configure or set various parameters or settings associated with the selected controller. Selection of button 924 enables a user to select the type of controller. Selection of button 926 enables a user to manually set-up or configure the controller. Selection of button 928 enables a user to manage profiles associated with the controller, and selection of button 930 enables a user to manage motions associated with the controller.

Figure 10:
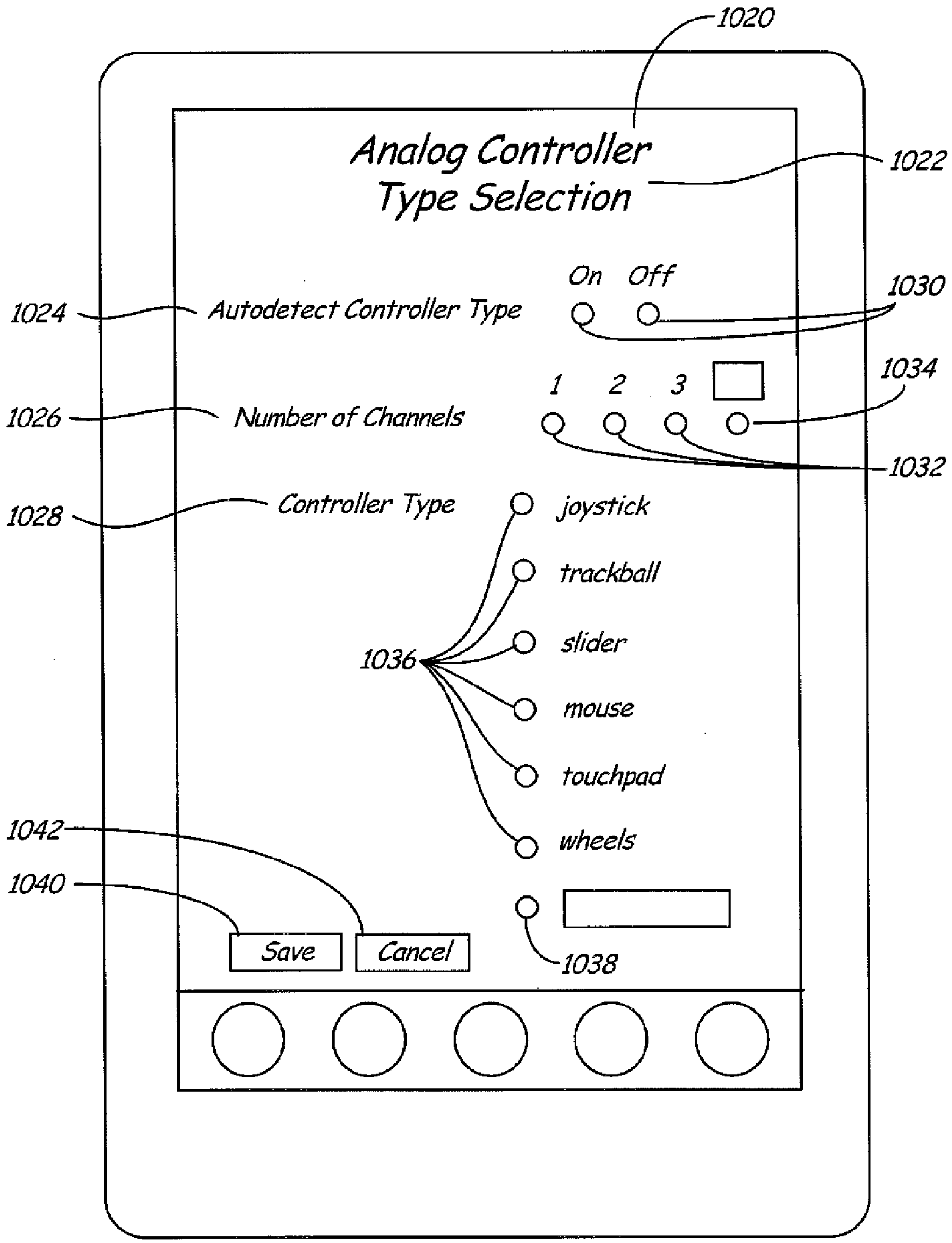
FIG. 10 is an example of one embodiment of an Analog Controller Type Selection user interface.

FIG. 10 shows an example of an Analog Controller Type Selection interface 1020. Interface 1020 is illustratively displayed after the controller type selection button 924 in FIG. 9 is selected. Interface 1020 includes a title or header section 1022 that identifies the current user interface being displayed and/or the associated controller. Interface 1020 optionally includes an autodetect section 1024, a number of channels section 1026, and a controller type section 1028. Autodetect section 1024 enables a user to activate or deactivate an autodetect capability by selecting one of the radio buttons 1030. For example, activation of the autodetect capability enables the device to automatically determine information about the analog controller such as type (e.g. joystick) and number of channels (e.g. 2). Deactivation of the autodetect capability enables a user to manually enter information about the analog controller (e.g. type, number of channels, etc.). Autodetect section 1024 also includes a label portion (e.g. "autodetect controller type") that identifies the section.

Number of channels section 1026 enables a user to manually enter the number of channels associated with the selected controller. Embodiments are not limited to any specific manner of receiving an indication of a number of channels from a user. In the specific embodiment shown in FIG. 10, section 1026 includes a plurality of radio buttons 1032 that are associated with particular numbers, and a radio button 1034 that is associated with a user-editable field. For instance, selection of button 1034 enables a user to type in a number of channels (e.g. 5, 6, etc.). Number of channels section 1026 may also include a label portion (e.g. "number of channels") that identifies the section.

Controller type section 1028 enables a user to manually select a type for the selected controller. Again, embodiments are not limited to any specific manner of receiving an indication of a type of controller from a user. In the specific embodiment shown in FIG. 10, section 1028 includes a label portion (e.g. "controller type") and a plurality of radio buttons 1036 and 1038. Buttons 1036 allow a user to select a particular type of controller (e.g. joystick, trackball, etc.), and button 1038 allows a user to manually enter a type of controller, for example, by typing in a controller name.

Interface 1020, as well as the other interfaces shown in this application, also optionally includes a save button 1040 and/or a cancel button 1042. Selection of save button 1040 saves the information (e.g. number of channels, controller type, etc.) that a user has entered to memory. The saved information is illustratively associated with the particular controller selected using interface 820 in FIG. 8. Selection of cancel button 1042 returns a user to a previous interface without saving any entered information.

Figure 11:
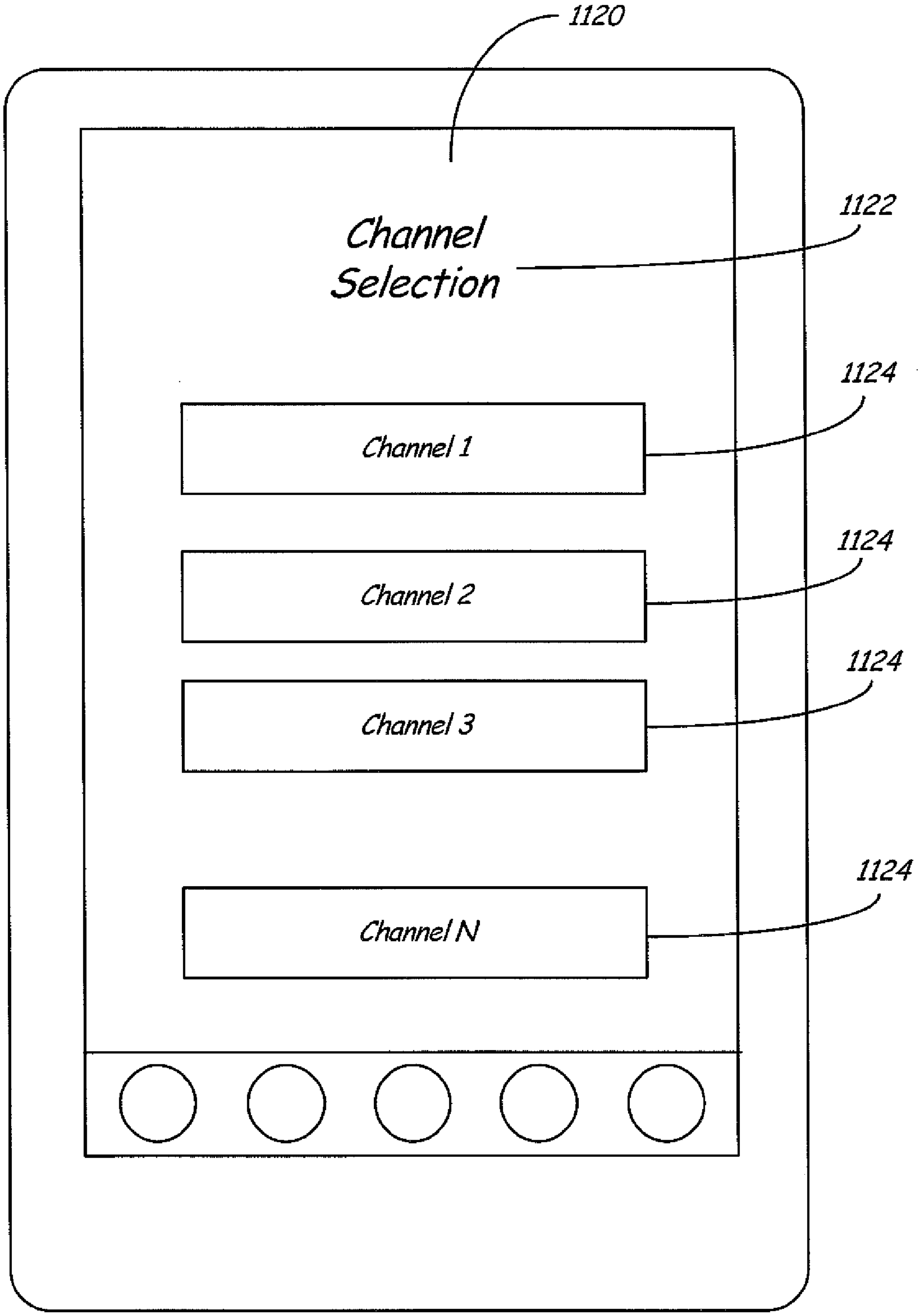
FIG. 11 is an example of one embodiment of a Channel Selection user interface.

FIG. 11 shows an example of a Channel Selection interface 1120. Interface 1120 is illustratively displayed after the manual set-up/configuration button 926 in FIG. 9 is selected. Interface 1120 includes a title or header section 1122 that identifies the current user interface being displayed and/or the associated controller. Interface 1120 also optionally includes any number N of user selectable buttons 1124. Each button 1124 is associated with a particular channel. The button labels (e.g. "Channel 1," "Channel 2," etc.) are optionally user editable such that a user can specify that different labels be shown. For example, a user may rename the channels "pan," "tilt," "roll," and "zoom." The number of buttons 1124 shown in FIG. 11 can include any number of channels. In one embodiment, the number of channels shown in interface 1120 corresponds to or matches the number of channels selected in section 1026 of FIG. 10. Selection of one of the buttons 1124 illustratively enables a user to edit the set-up or configuration of the corresponding channel.

Figure 12:
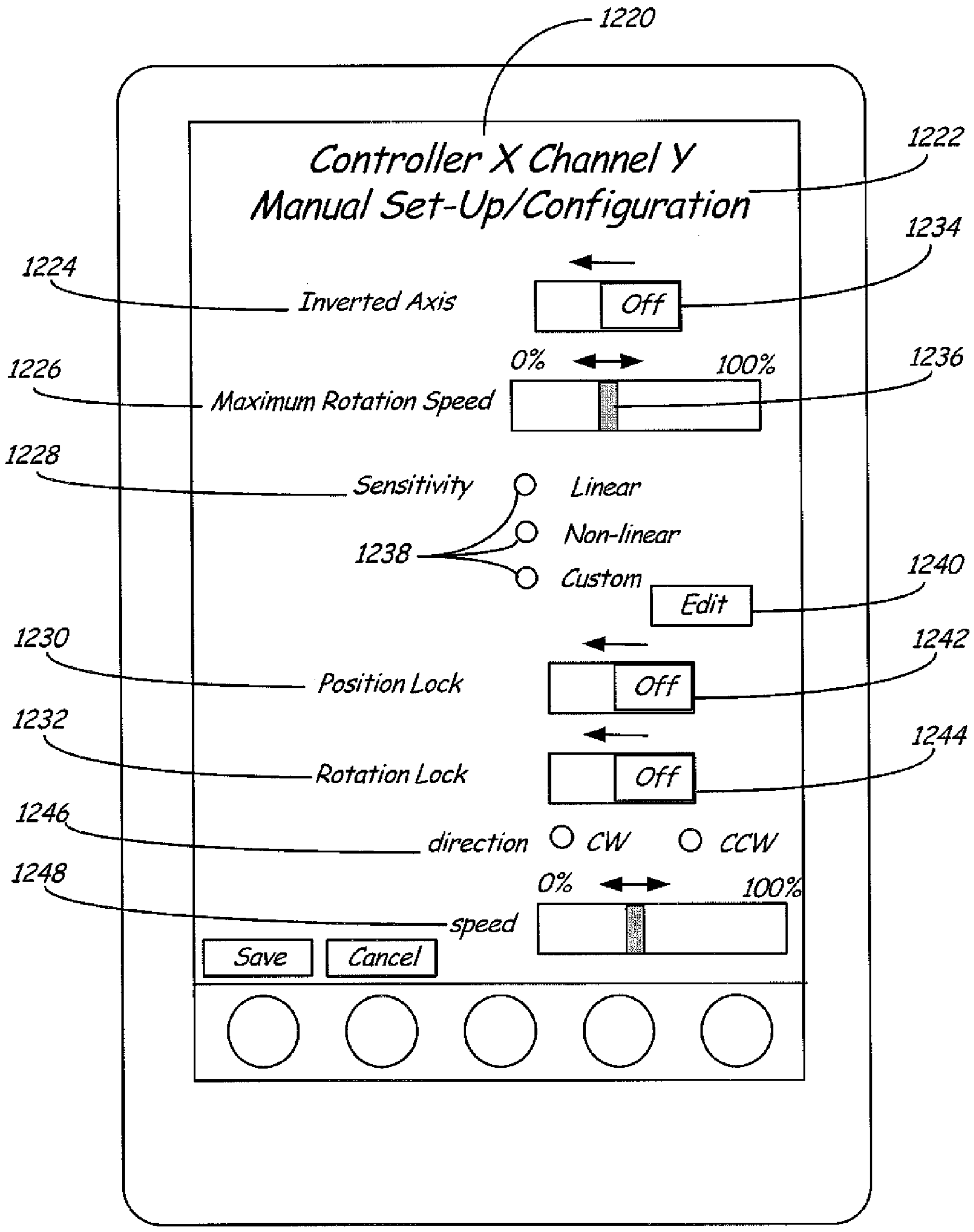
FIG. 12 is an example of one embodiment of a Channel Set-Up user interface.

FIG. 12 shows an example of a Channel Set-Up/Configuration interface 1220. Interface 1220 is illustratively displayed after one of the channel buttons 1124 in FIG. 11 is selected. Interface 1220 includes a title or header section 1222 that identifies the current user interface being displayed, the associated controller, and/or the associated channel. For example, if the "Channel 2" button is selected in FIG. 11, header section 1222 could read "Channel 2 Set-Up/Configuration." Interface 1222 illustratively enables a user to edit parameters and/or settings associated with the selected channel. The particular embodiment shown in FIG. 12 shows some examples of parameters and settings that can be edited/changed by a user. However, it should be noted that embodiments of the present disclosure are not limited to any particular parameters and settings, and embodiments include any parameters and settings that may be associated with a channel.

Interface 1220 illustratively includes an inverted axis section 1224, a maximum rotation speed section 1226, a sensitivity section 1228, a position lock section 1230, and a rotation lock section 1232. Each of the sections optionally include a label (e.g. "inverted axis, "sensitivity," etc.) that identifies the functionality associated with each section. Inverted axis section 1224 optionally includes a button 1234 that enables a user to invert control of the associated channel. Button 1234 can comprise an on/off slider, radio buttons, a user-editable field, a drop-down menu, etc. Turning inverted channel "on" illustratively reverses control of the channel. For example, if left on a joystick normally corresponds to clockwise rotation and right corresponds to counter-clockwise rotation, turning inverted channel "on" makes left on the joystick correspond to counter-clockwise rotation, and right on the joystick correspond to clockwise rotation.

Maximum rotation speed section 1226 includes a slider 1236 that enables a user to set the maximum rotational speed of the motor associated with the channel from 0 to 100%. For example, if a user sets slider 1236 at "50%," the maximum rotational speed of the motor associated with the channel will be half of its maximum possible speed (e.g. 30 rpm instead of 60 rpm). Section 1226 is not however limited to any particular implementation, and may include other buttons or fields (e.g. a user-editable field) that enable a user to set a maximum rotational speed.

Sensitivity section 1228 optionally includes three radio buttons 1238. Buttons 1238 enable a user to configure the sensitivity parameters of the associated channel. For instance, buttons 1238 may include buttons corresponding to linear, non-linear, and custom sensitivity. In one embodiment, section 1228 includes an edit button 1240 that allows a user to edit or set the customized sensitivity.

Figure 13:
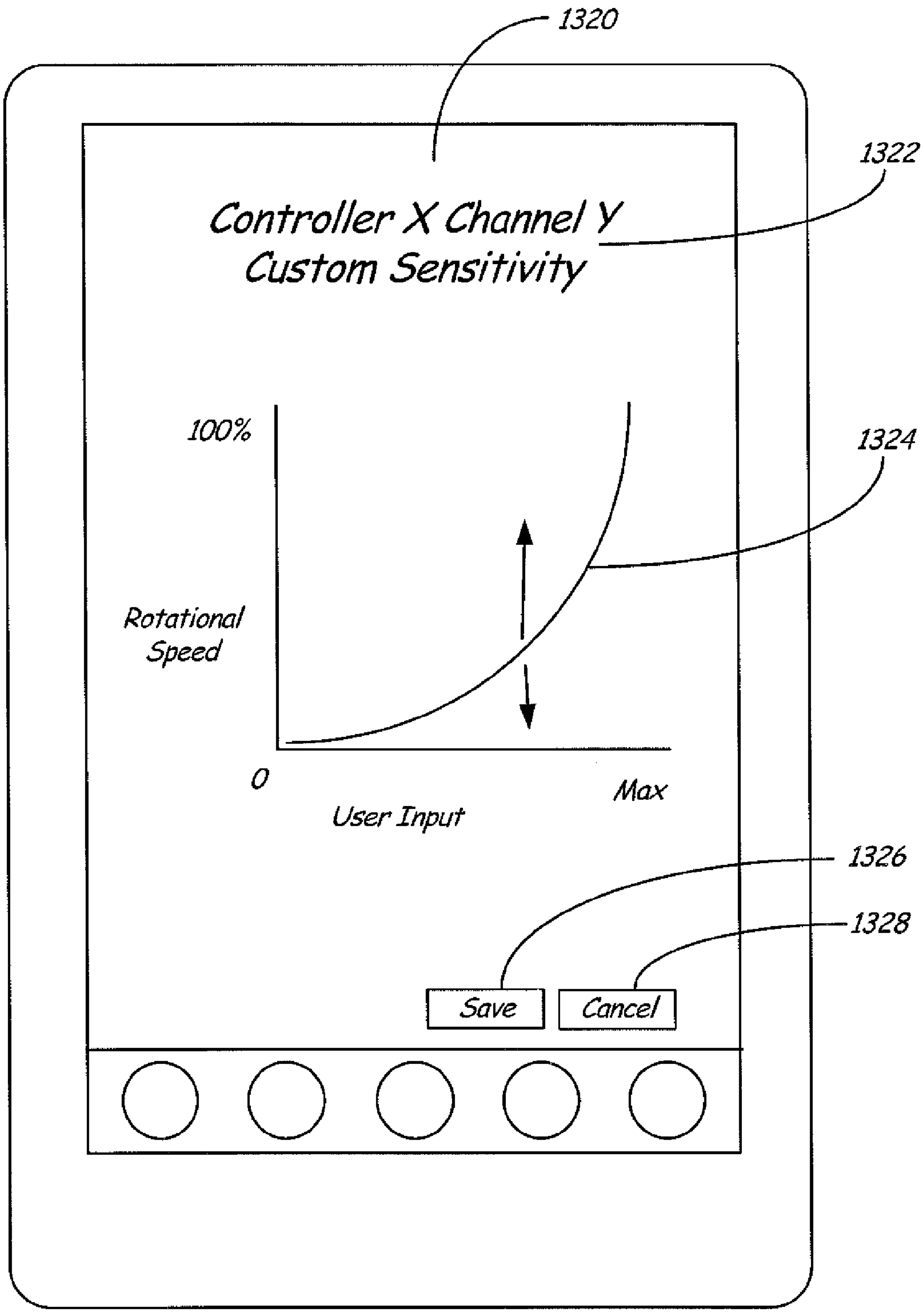
FIG. 13 is an example of one embodiment of a Custom Sensitivity user interface.

FIG. 13 shows an example of a Custom Sensitivity interface 1320 that is displayed after edit button 1240 in FIG. 12 is selected. Interface 1320 includes a title or header section 1322 that identifies the interface, the channel, and/or the controller associated with the displayed sensitivity. Interface 1320 also includes a user editable sensitivity response line 1324. A user can move response line 1324 up and down along the entire length of the line to set a custom sensitivity response. Interface 1320 optionally includes a save button 1326 and a cancel/back button 1328. A user can press the save button 1326 to save changes to response line 1324 and return to the previous screen, or a user can press the cancel/back button 1328 to undo any changes to response line 1324 and return to the previous screen.

Returning to FIG. 12, position lock section 1230 includes a slider 1242. Toggling slider 1242 from the off to the on position locks the corresponding motor at its current position. In another embodiment, section 1230 includes radio buttons (e.g. "on" and "off"), or a user-editable field that enables a user to enter a specific position. Embodiments are not however limited to any particular method of implementing a position lock and include any interfaces and/or methods of setting a position lock for a channel.

Rotation lock section 1232 includes a slider 1244 to toggle the rotation lock from the off to the on position. Toggling rotation lock to the on position illustratively sets a rotational speed of the corresponding motor to one constant value. Section 1232 optionally includes radio buttons 1246 to indicate/set the direction of rotation (e.g. clockwise or counterclockwise) and a speed selector to set the rotational speed of the motor from 0 to 100% of its maximum rotation speed. For example, if a user selects "CW" and "50%," the motor will rotate constantly in the clockwise direction at a speed that is half of its maximum speed.

Figure 14:
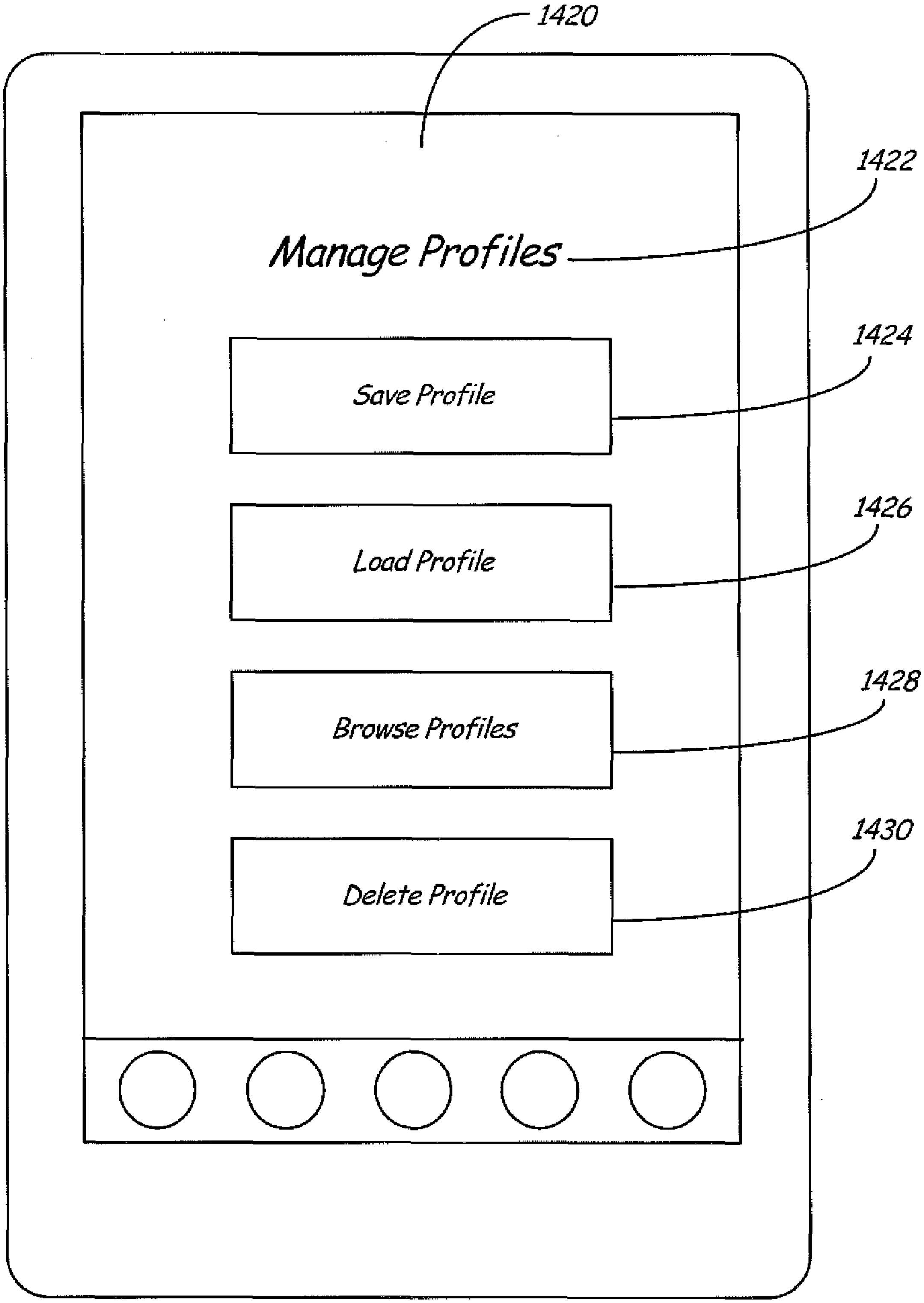
FIG. 14 is an example of one embodiment of a Manage Profiles user interface.

FIG. 14 shows an example of a Manage Profiles interface 1420. Interface 1420 is illustratively displayed after Manage Profiles button 928 in FIG. 9 is selected, and enables a user to save, load, browse, and delete profiles. Interface 1420 includes a title or header section 1422 that identifies the current user interface being displayed, the associated controller, and/or the associated channel. Interface 1420 also optionally includes a Save Profile button 1424, a Load Profile button 1426, a Browse Profiles button 1428, and a Delete Profile button 1430.

Figure 15:
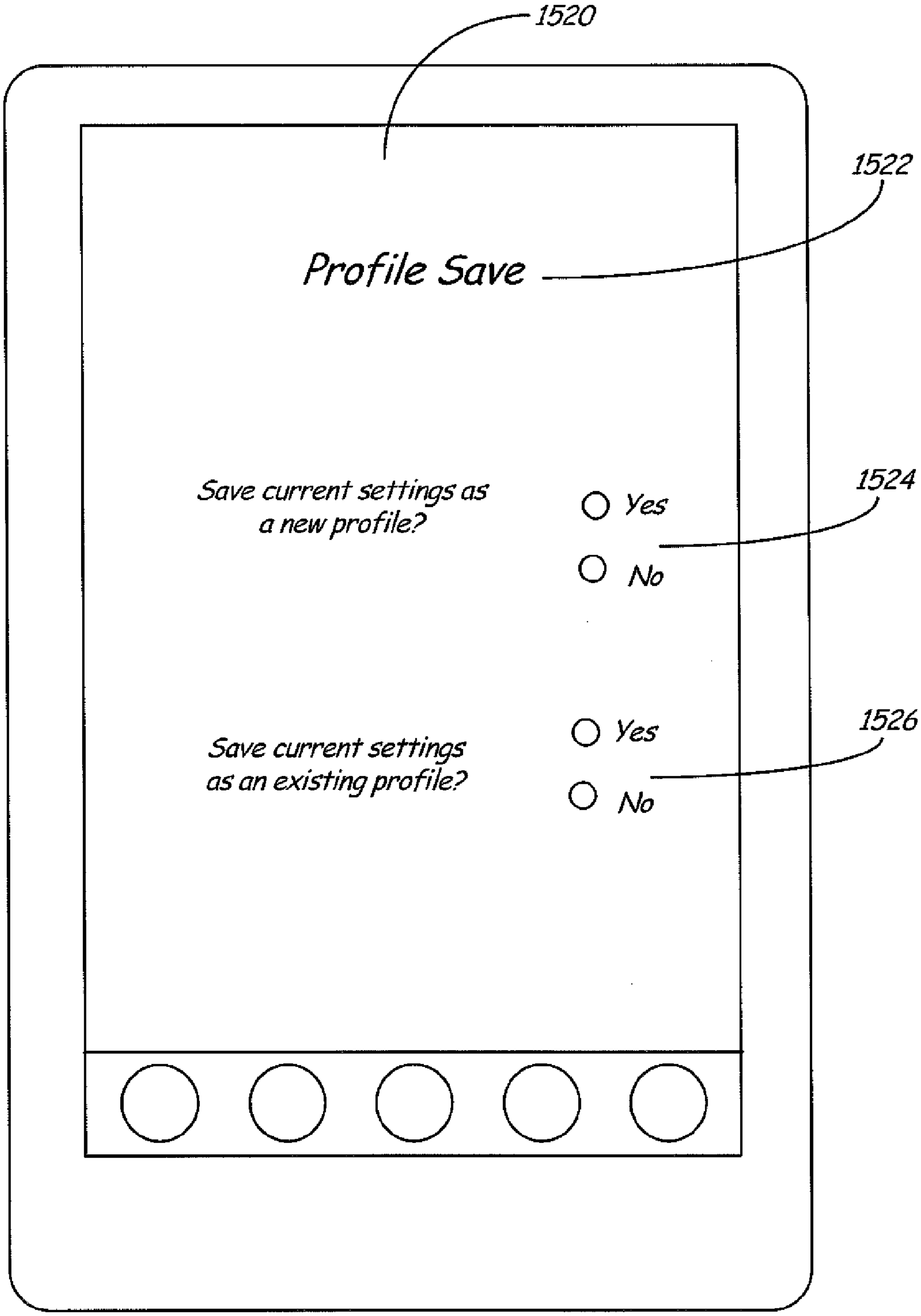
FIG. 15 is an example of one embodiment of a Profile Save user interface.

FIG. 15 shows an example of a Profile Save interface 1520. Interface 1520 is illustratively displayed after Save Profile button 1424 in FIG. 14 is selected. Interface 1520 includes a title or header section 1522, a new profile section 1524, and an existing profile section 1526. New profile section 1524 includes buttons (e.g. radio buttons, sliders, etc.) that enable a user to save the current settings for a controller and/or a channel as a new profile. Existing profile section 1526 includes buttons (e.g. radio buttons, sliders, etc.) that enable a user to save the current settings for a controller and/or a channel as an existing profile. For example, a user may adjust various settings for a controller and channels of the controller utilizing interfaces such as those shown in FIGS. 10 and 12. The user could then save all of the settings (e.g. store them to memory) by either saving them as a new profile using section 1524 or saving them as an existing profile using section 1526. In an embodiment, if a user chooses to save settings as a new profile, the user receives other user interfaces or prompts that enable the user to enter a name or other identifier for the new profile. If a user chooses to save settings as an existing profile, the user receives other user interfaces or prompts that provide the user with a list of existing profiles that the user can overwrite to save the current settings.

Figure 16:
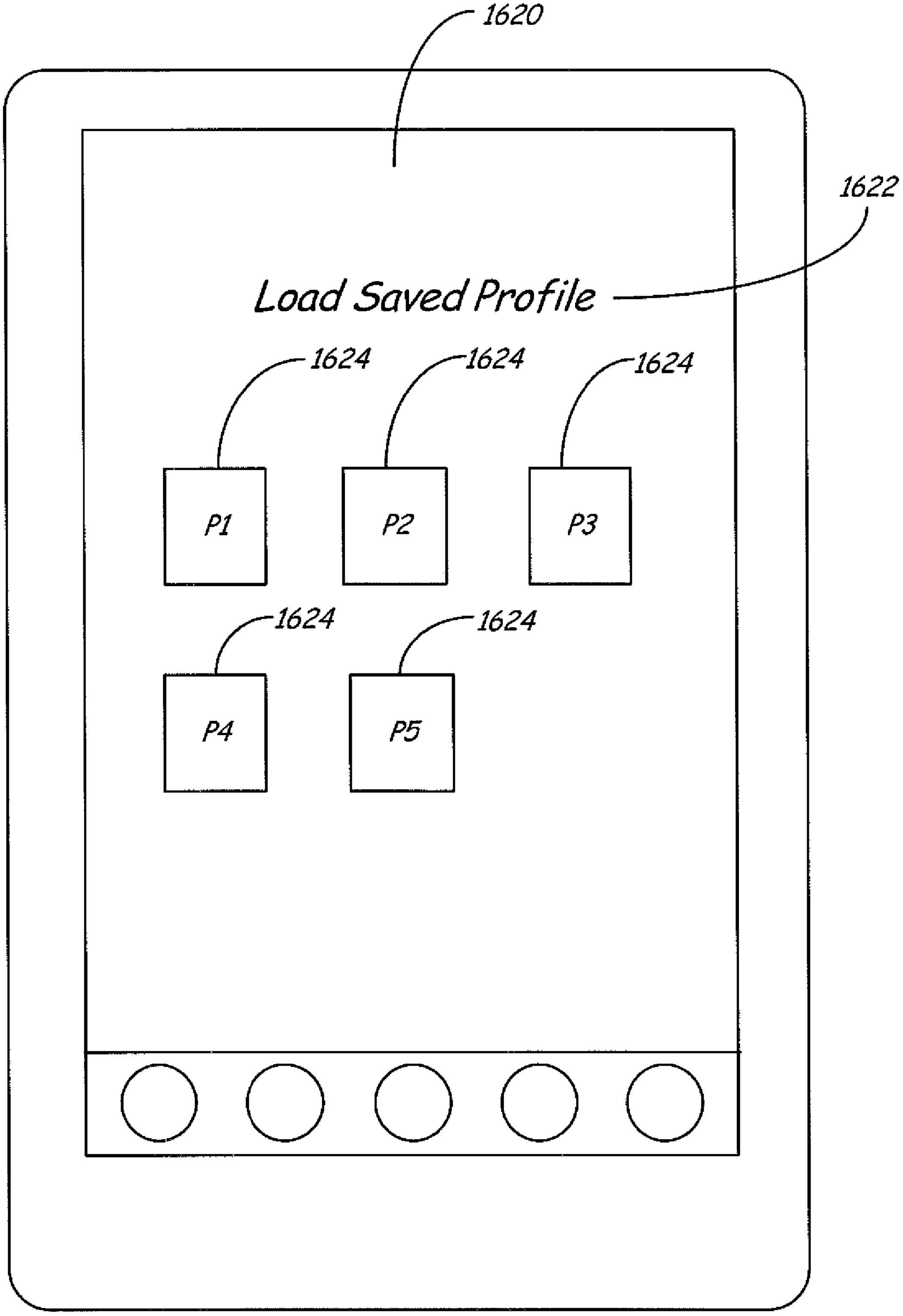
FIG. 16 is an example of one embodiment of a Load Saved Profile user interface.

FIG. 16 shows an example of a Load Saved Profile interface 1620. Interface 1620 is illustratively displayed after Load Profile button 1426 in FIG. 14 is selected. Interface 1620 includes a title or header section 1622 that identifies the current user interface being displayed, the associated controller, and/or the associated channel. Interface 1620 also includes a plurality of icons or buttons 1624. Each icon 1624 corresponds to a different profile that has been previously saved or otherwise stored to memory. Each profile includes values for parameters such as for the parameters shown in FIGS. 10 and 12. In one embodiment, the labels or names associated with each icon 1624 are user-editable such that a user can rename any of the icons. Selection of one of the icons 1624 illustratively loads the associated settings to the controller. A confirmation step is optionally displayed prior to changing the controller settings.

Figure 17:
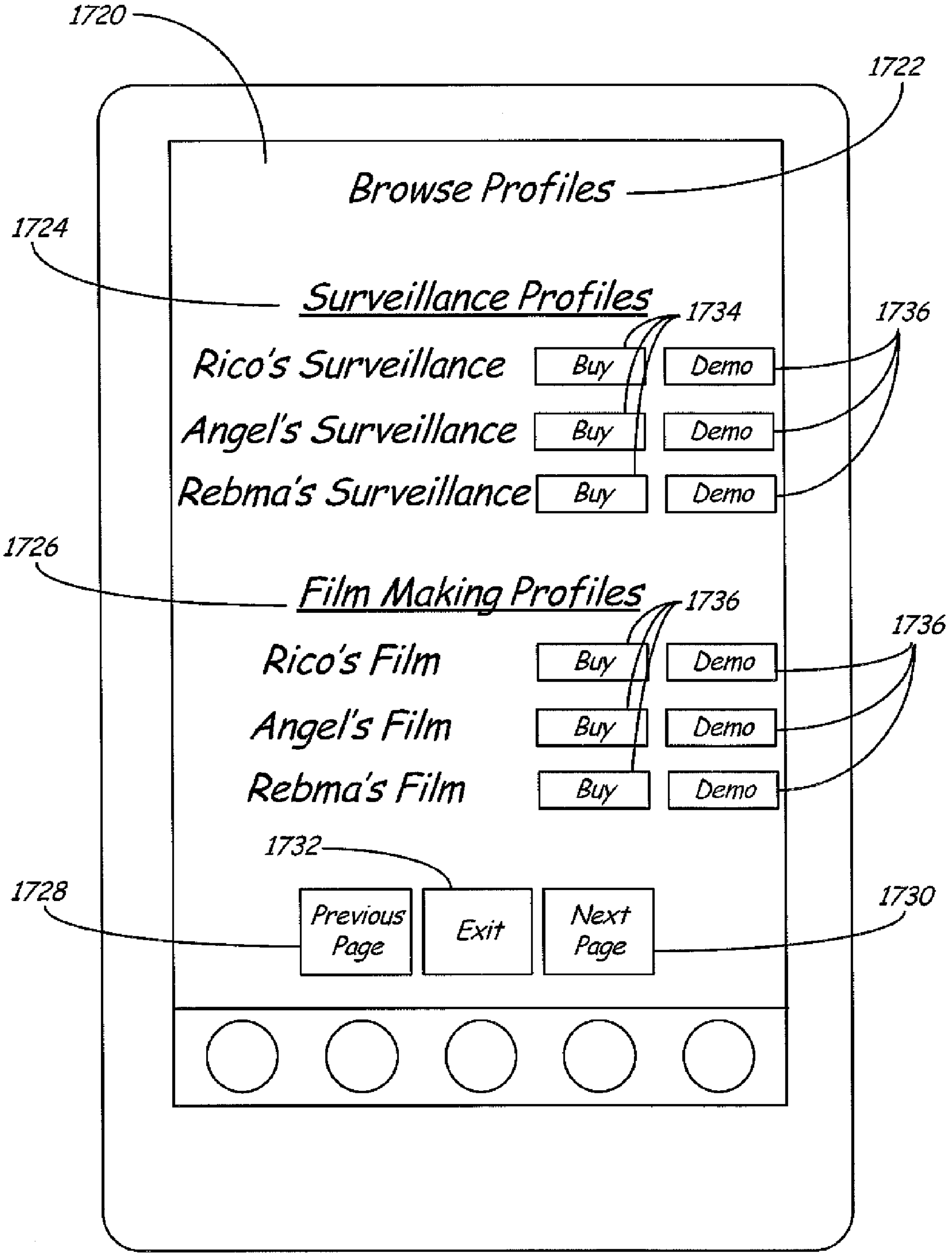
FIG. 17 is an example of one embodiment of a Browse Profiles user interface.

FIG. 17 shows an example of a Browse Profiles interface 1720. Interface 1720 is illustratively displayed after Browse Profiles button 1428 in FIG. 14 is selected. Interface 1720 includes a title or header section 1722 that identifies the current user interface being displayed. In an embodiment, interface 1720 is used by a user to browse or search for profile settings that can be downloaded or otherwise transferred to the controller. For instance, profiles may be accessed from a cloud computing network such as the network shown in FIG. 7. The profiles may be grouped into categories and a user can browse different categories. For example, in the particular embodiment shown in FIG. 17, the interface includes a first category 1724 (e.g. "Surveillance Profiles") and a second category 1726 (e.g. "Film Making Profiles"). A user is illustratively able to browse additional categories shown on other pages by selecting either the previous page button 1728 or the next page button 1730. The user can exit the Browsing Profile interface 1720 by selecting the exit button 1732.

Each category may include one or more specific profiles that belongs to that category. For example, in FIG. 17, the Surveillance Profiles category 1724 includes the profiles "Rico's Surveillance," "Angel's Surveillance," and "Remba's Surveillance," and the Film Making Profiles category 1726 includes the profiles "Rico's Film," "Angel's Film," and "Remba's Film." In an embodiment, a user is able to select one of the profiles to download by selecting a download or buy button 1734. Selection of button 1734 optionally begins a sequence in which a user can buy or download the profile from a content provider (e.g. content provider 704 in FIG. 7). Additionally, a user may also have an option provided by a button 1736 to download a demo or trial version of the profile from the content provider. The demo or trial version of the profile may be for a reduced fee or could be for free. However, it should be noted that Browse Profiles interface 1720 is not limited to any particular implementation and includes any interface or set of interfaces that allows a user to browse and download profiles from a content provider.

Figure 18:
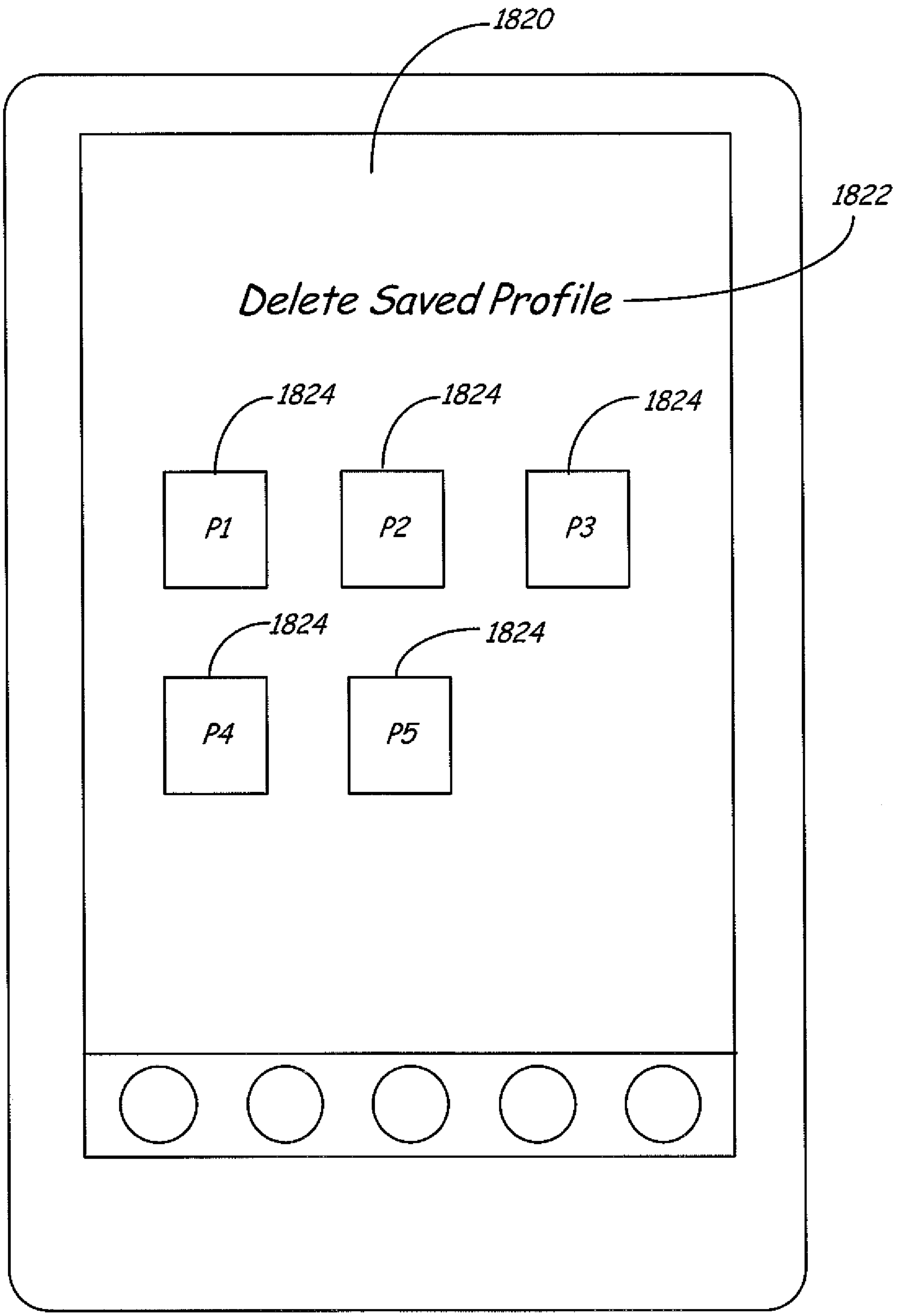
FIG. 18 is an example of one embodiment of a Delete Saved Profile user interface.

FIG. 18 shows an example of a Delete Saved Profile interface 1820. Interface 1820 is illustratively displayed after Delete Profile button 1430 in FIG. 14 is selected. Interface 1820 includes a title or header section 1822 that identifies the current user interface being displayed, the associated controller, and/or the associated channel. Interface 1820 also includes a plurality of icons or buttons 1824. Each icon 1824 corresponds to a different profile that has been previously saved or otherwise stored to memory. Selection of one of the icons 1824 illustratively deletes the profile and its associated settings. A confirmation step is optionally displayed prior to deleting any profile.

Figure 19:
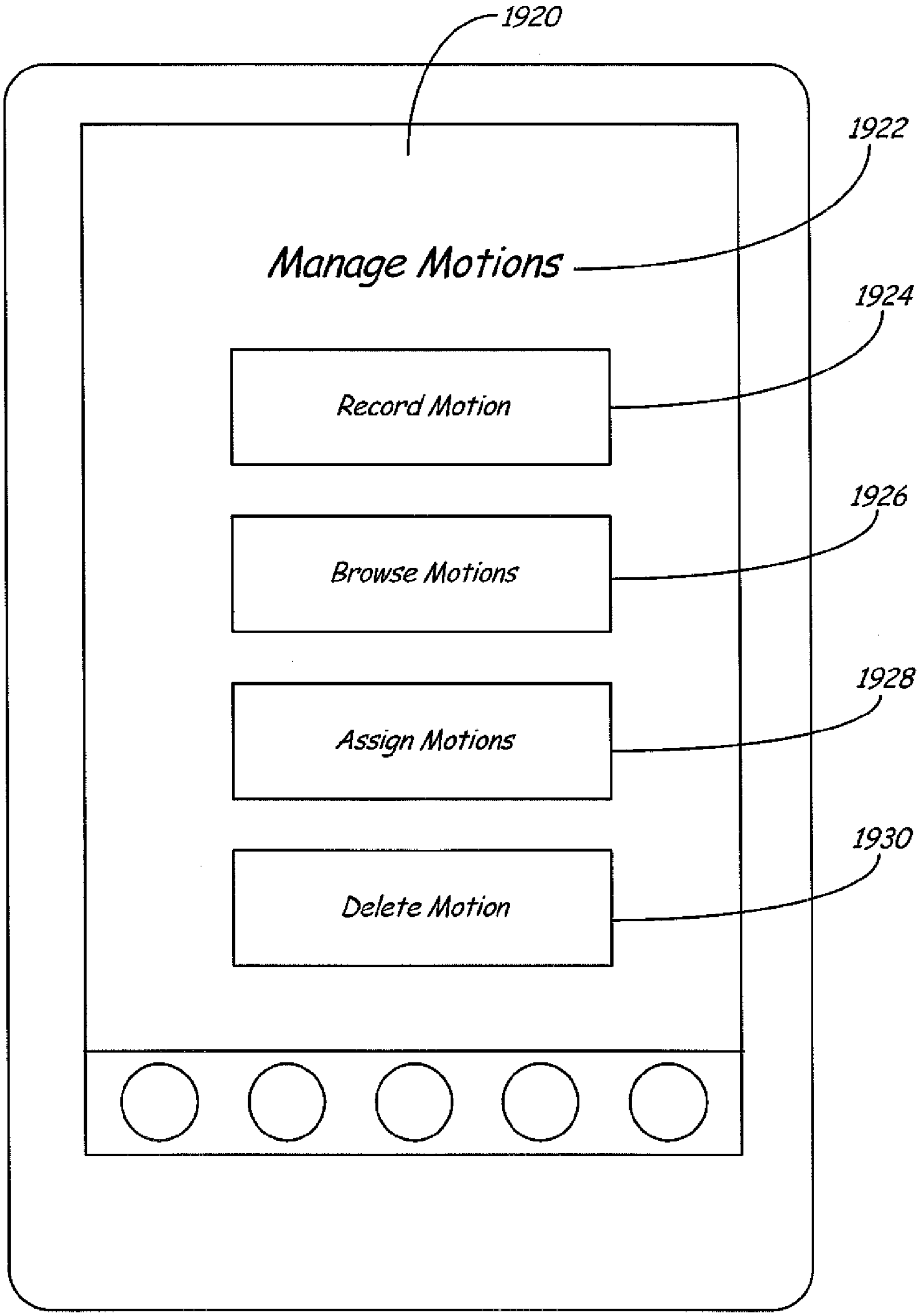
FIG. 19 is an example of one embodiment of a Manage Motions user interface.

FIG. 19 shows an example of a Manage Motions interface 1920. Interface 1920 is illustratively displayed after Manage Motions button 930 in FIG. 9 is selected, and enables a user to record, assign, browse, and delete motions. Interface 1920 includes a title or header section 1922 that identifies the current user interface being displayed, the associated controller, and/or the associated channel. Interface 1920 also optionally includes a Record Motion button 1924, a Browse Motions button 1926, an Assign Motions button 1928, and a Delete Motion button 1930.

Figure 20:
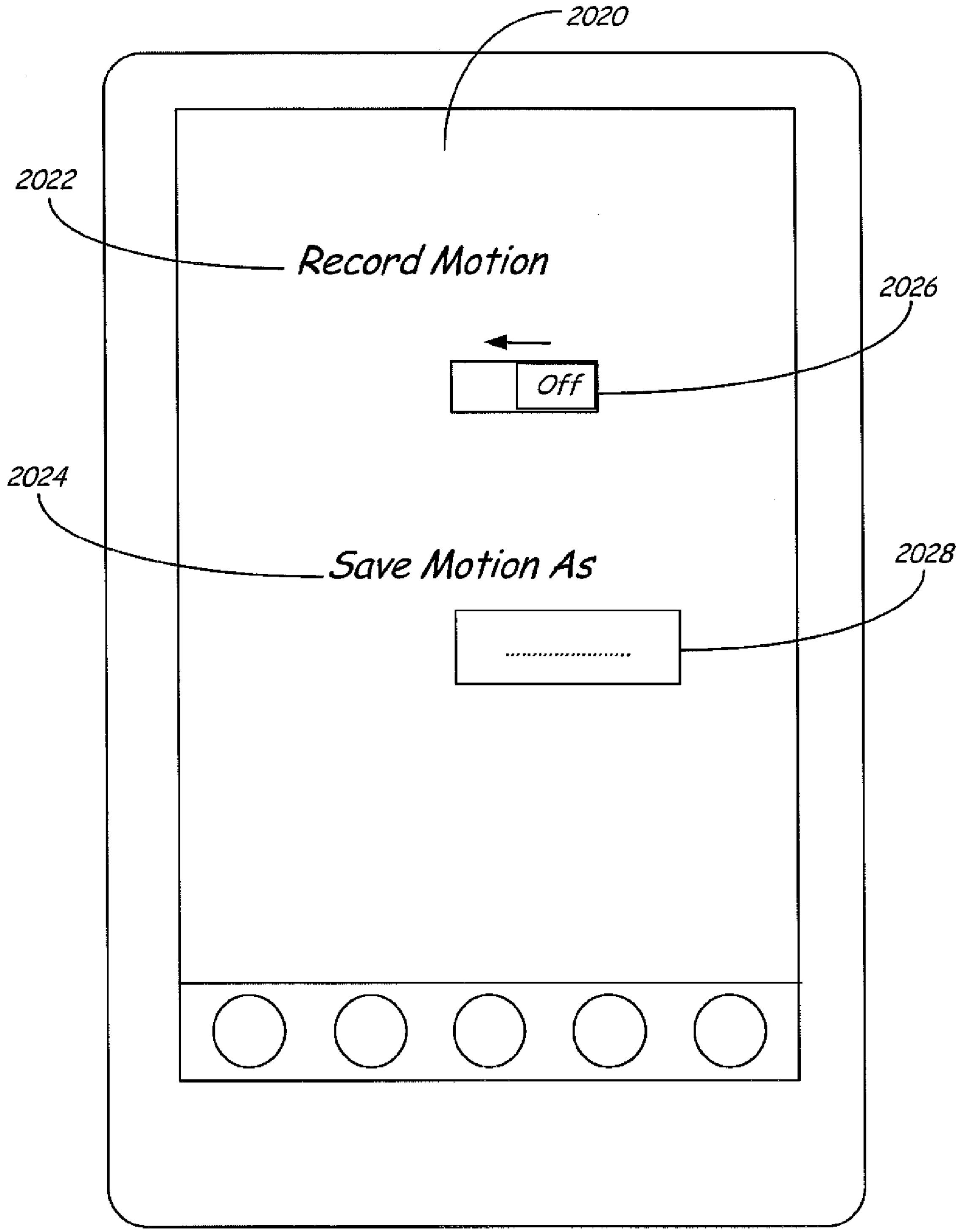
FIG. 20 is an example of one embodiment of a Record Motion user interface.

FIG. 20 shows an example of a Record Motion interface 2020. Interface 2020 is illustratively displayed after Record Motion button 1924 in FIG. 19 is selected. Interface 2020 optionally includes a record motion section 2022 and a save motion section 2024. Each section optionally includes a label or name that identifies the section. In interface 2020, a user can record a motion by toggling icon 2026 to the on position, and a user can enter a name for the recorded motion be selecting icon 2028. In one embodiment, a user is able to record a motion by performing a move or a set of moves utilizing an analog control input mechanism (e.g. analog control input mechanism 308 in FIG. 3), and the corresponding inputs are recorded by a digital input control mechanism (e.g. digital control input mechanism 310 in FIG. 3). For example, a user could move the sticks of a joystick, and the movement of the joysticks would be recorded by a smartphone (e.g. an iPhone) being utilized as a digital controller. Embodiments are not however limited to any particular implementation, and embodiments of recording motions include any configuration of controllers or user interfaces for recording motions.

Figure 21:
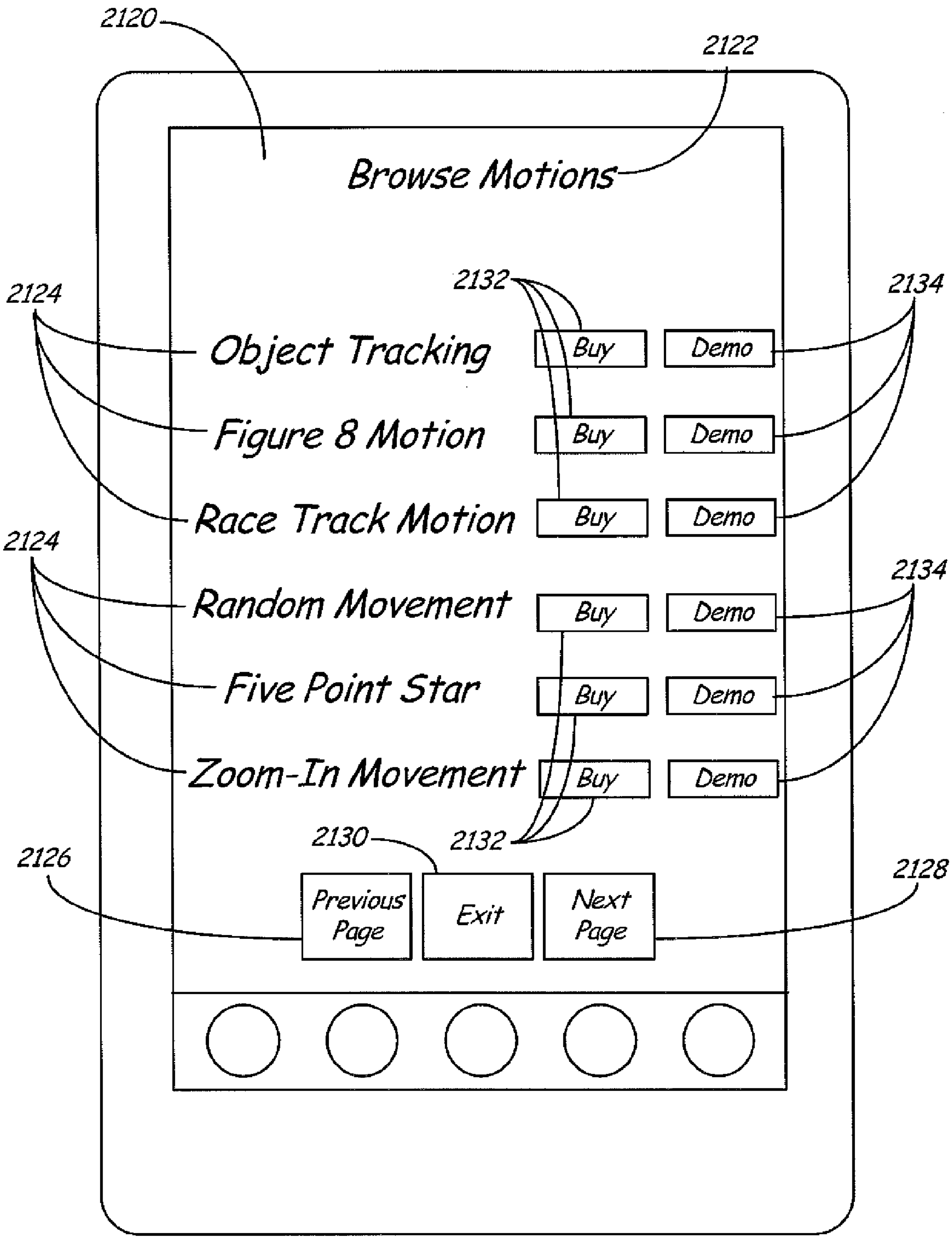
FIG. 21 is an example of one embodiment of a Browse Motions user interface.

FIG. 21 shows an example of a Browse Motions interface 2120. Interface 2120 is illustratively displayed after Browse Motions button 1926 in FIG. 19 is selected. Interface 2120 includes a title or header section 2122 that identifies the current user interface being displayed. In an embodiment, interface 2120 is used by a user to browse or search for motions that can be downloaded or otherwise transferred to the controller. For instance, motions may be accessed from a cloud computing network such as the network shown in FIG. 7. The motions illustratively include a group of settings, extensions, or computer executable instructions (e.g. software applications) that can be downloaded to a digital control input mechanism and utilized by an analog control input mechanism. FIG. 21 shows some examples of motions 2124 (e.g. settings or applications) that can be downloaded. Motions 2124 include an object tracking motion, a FIG. 8 motions, a race track motion, a random movement motion, a five point star motion, and a zoom-in motion. For example, object tracking motion illustratively corresponds to an application that controls one or more channels of an analog controller to perform fully-automated tracking of an object. In an embodiment, a user is able to browse additional motions shown on other pages by selecting either the previous page button 2126 or the next page button 2128. The user can exit the Browse Motions interface 2120 by selecting the exit button 2130.

Interface 2120 optionally enables a user to select one of the motions to download by selecting a download or buy button 2132. Selection of button 2132 illustratively begins a sequence in which a user can buy or download the motion from a content provider (e.g. content provider 704 in FIG. 7). Additionally, a user may also have an option provided by a button 2134 to download a demo or trial version of the motion from the content provider. The demo or trial version of the motion may be for a reduced fee or could be for free. However, it should be noted that Browse Motions interface 2120 is not limited to any particular implementation and includes any interface or set of interfaces that allows a user to browse and download motions from a content provider.

Figure 22:
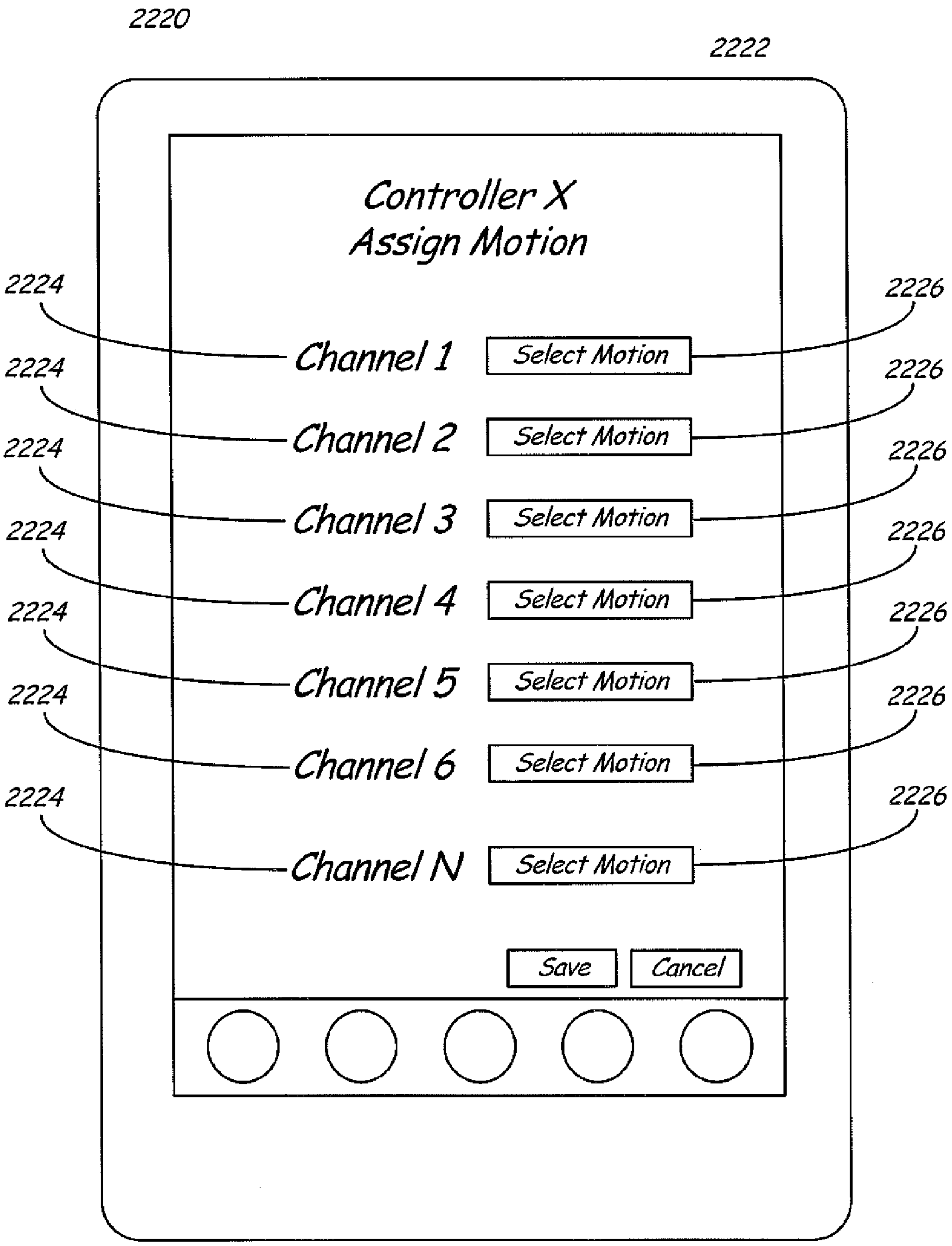
FIG. 22 is an example of one embodiment of an Assign Motion user interface.

FIG. 22 shows an example of an Assign Motion interface 2220. Interface 2220 is illustratively displayed after Assign Motion button 1928 in FIG. 19 is selected, and enables a user to assign a motion to a controller and/or to a channel. Interface 2220 includes a title or header section 2222 that identifies the current user interface being displayed, the associated controller, and/or the associated channel(s). Interface 2220 also optionally includes one or more names or labels 2224 that identifies the associated channel, controller, etc. In an embodiment, each label 2224 has a corresponding button 2226. Selection of button 2226 enables a user to select a motion to assign to the channel. In one embodiment, selection of one of the buttons 2226 causes additional prompts and/or user interfaces to be generated that allow a user to select a motion. The motions that can be assigned include any of the recorded motions (e.g. FIG. 20) or any motions that may have been downloaded from a content provider (e.g. FIG. 21). Accordingly, the selectable motions include fully autonomous motions, semi-autonomous motions, and fully manual motions. Once a motion is selected for a particular channel, controller, etc., the associated button 2226 illustratively displays an indication (e.g. name or label) that identifies the selected motion. Additionally, it should be noted that interface 2220 can be used to assign motions for any number N of channels. The number N of channels displayed in interface 2220 could for example by the number of channels selected in interface 1020 in FIG. 10.

Figure 23:
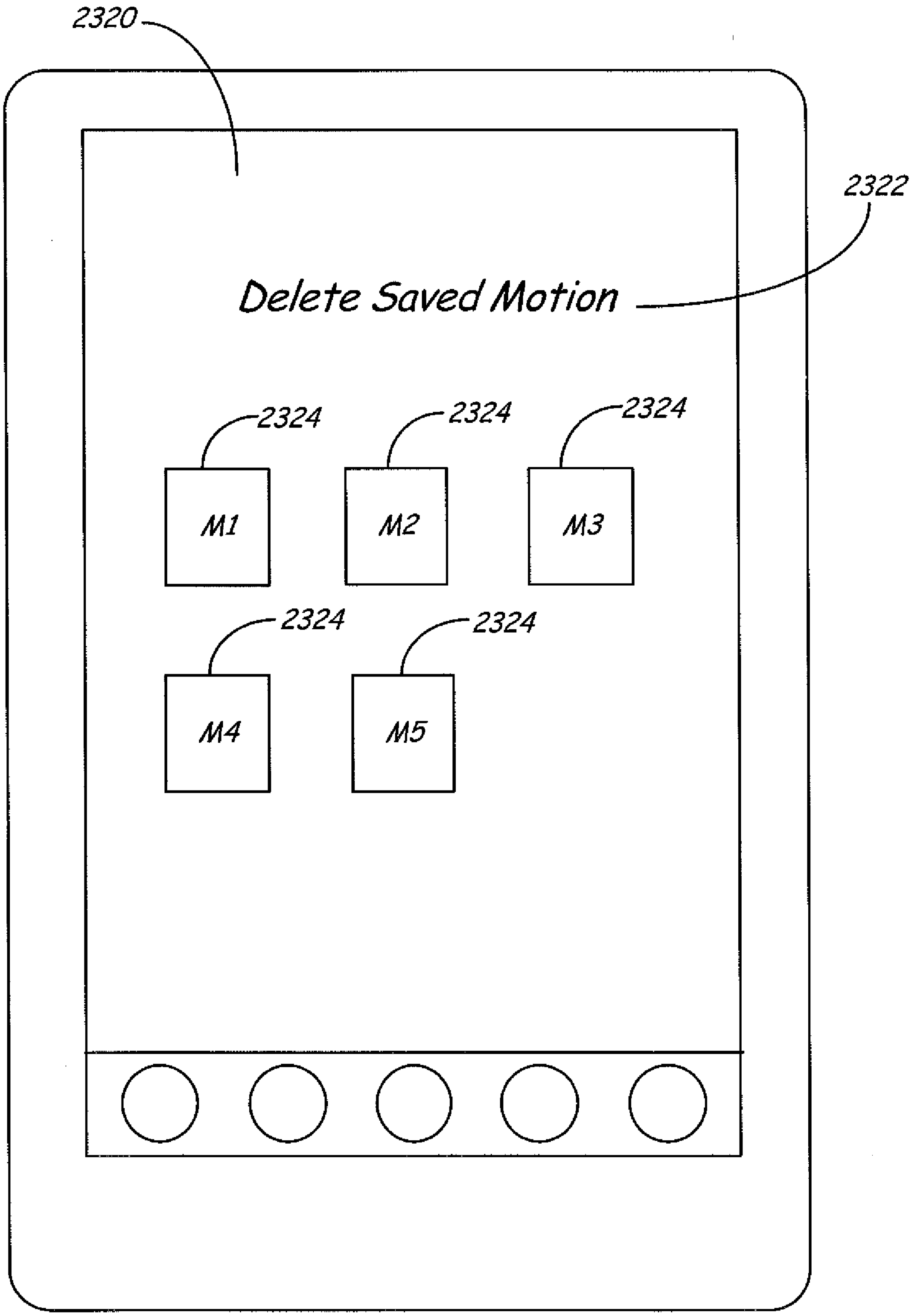
FIG. 23 is an example of one embodiment of a Delete Saved Motion user interface.

FIG. 23 shows an example of a Delete Saved Motion interface 2320. Interface 2320 is illustratively displayed after Delete Motion button 1930 in FIG. 19 is selected. Interface 2320 includes a title or header section 2322 that identifies the current user interface being displayed, the associated controller, and/or the associated channel. Interface 2320 also includes a plurality of icons or buttons 2324. Each icon 2324 corresponds to a different motion that has been previously saved or otherwise stored to memory. Selection of one of the icons 2324 illustratively deletes the motion and its associated settings. A confirmation step is optionally displayed prior to deleting any motion.

V. Digital Control Input Mechanism

Figure 24:
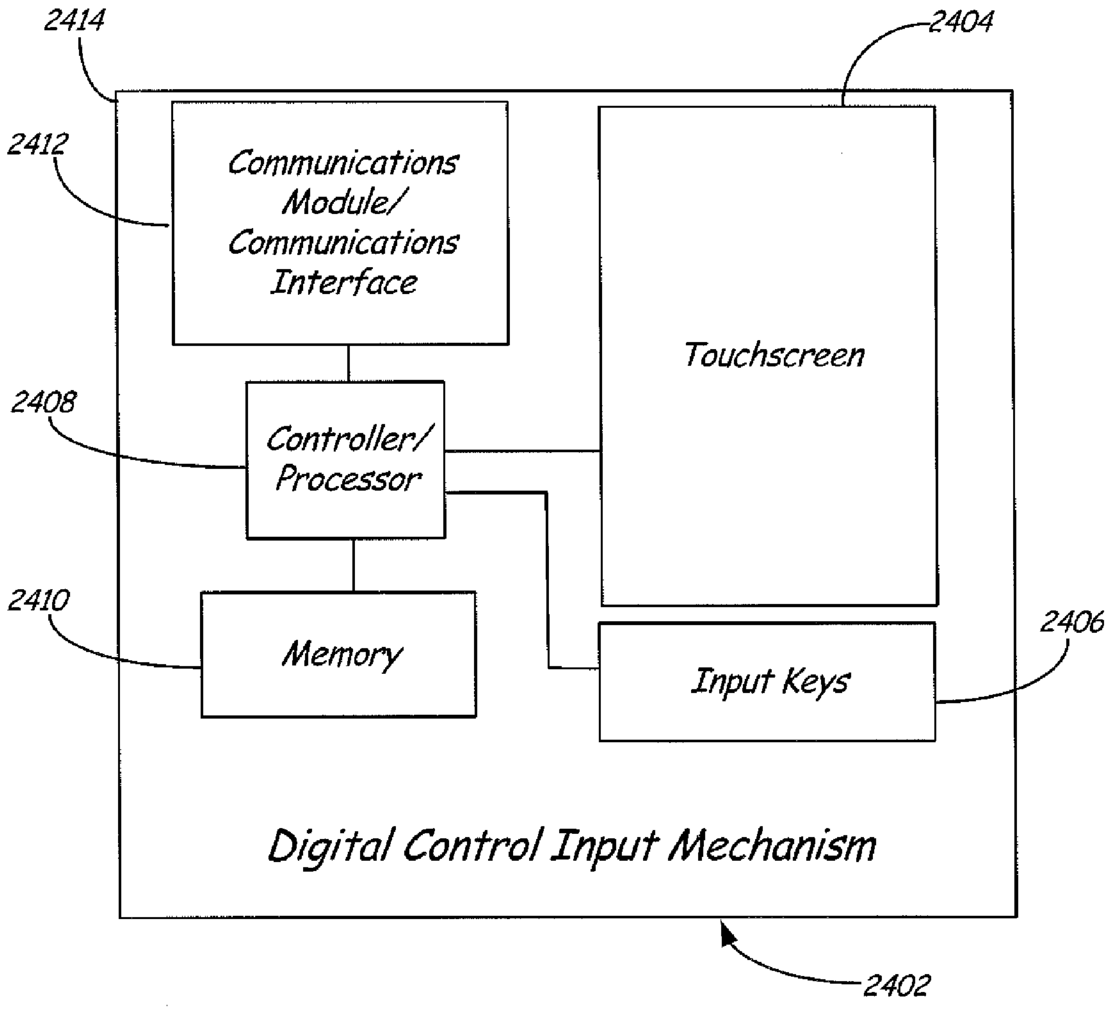
FIG. 24 is a schematic diagram of a digital control input mechanism.

FIG. 24 shows a block diagram of one example of a digital control input mechanism 2402. Certain embodiments of the present disclosure may be implemented utilizing an input mechanism such as that shown in FIG. 24. Embodiments are not however limited to any particular type or configuration of digital control input mechanism and may be implemented utilizing devices different than the one shown in the figure. Input mechanism 2402 illustratively includes a touchscreen 2404, input keys 2406, a controller/processor 2408, memory 2410, a communications module/communications interface 2412, and a housing/case 2414.

Touchscreen 2404 illustratively includes any type of single touch or multitouch screen (e.g. capacitive touchscreen, vision based touchscreen, etc.). Touchscreen 2404 is able to detect a user's finger, stylus, etc. contacting touchscreen 2404 and generates input data (e.g. x and y coordinates) based on the detected contact. Input keys 2406 include buttons or other mechanical devices that a user is able to press or otherwise actuate to input data. For instance, input keys 2406 may include a home button, a back button, 0-9 number keys, a QWERTY keyboard, etc.

Memory 2410 includes volatile, non-volatile or a combination of volatile and non-volatile memory. Memory 2410 may be implemented using more than one type of memory. For example, memory 2410 may include any combination of flash memory, magnetic hard drives, RAM, etc. Memory 2410 stores the computer executable instructions that are used to implement the control systems described above. Memory 2410 also stores user saved data such as programmed maneuvers, profile settings, and or content downloaded from a cloud network.

Controller/processor 2408 can be implemented using any type of controller/processor (e.g. ASIC, RISC, ARM, etc.) that can process user inputs and the stored instructions to generate commands for controlling systems such as, but not limited to, pan and tilt camera systems. The generated commands, etc. are sent to communications module/communications interface 2414 that transmits the commands to the controlled systems.

Finally with respect to input mechanism 2402, the controller housing 2414 can be any suitable housing. In one embodiment, housing 2414 has a form factor such that controller 2402 is able to fit within a user's hand. Housing 2414 may however be larger (e.g. tablet sized) and is not limited to any particular form factor.

VI. Conclusion

Embodiments of the present disclosure illustratively include one or more of the features described above or shown in the figures. Certain embodiments include devices and/or methods that can be used in implementing a variable autonomy level control system. In one particular embodiment, a control system includes both an analog control input mechanism (e.g. an analog controller) and a digital control input mechanism (e.g. a digital controller). The digital control input mechanism can be used in adjusting settings, parameters, configurations, etc. of the analog control input mechanism. In some embodiments, profiles, settings, applications, and other computer executable instructions can be downloaded or otherwise transferred to a digital control input mechanism from a cloud computing network. The downloaded content can be used by the analog and digital control input mechanism in generating signals for a motor controller or other device.

Finally, it is to be understood that even though numerous characteristics and advantages of various embodiments have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. In addition, although certain embodiments described herein are directed to pan and tilt systems, it will be appreciated by those skilled in the art that the teachings of the disclosure can be applied to other types of control systems, without departing from the scope and spirit of the disclosure.

What is claimed is:

1. A control circuit board comprising:

an analog communications support component configured to receive an analog input from a user of the control circuit board;

a digital communications support component configured to receive content from a cloud computing network wherein receiving content comprises purchasing or accessing a stored digital input for a digital input control mechanism;

a processing component that is configured to synthesize the received stored digital input and the received analog inputs at substantially the same time, and, wherein synthesizing comprises reconciling the analog input and the stored digital inputs into an output such that the output is based at least in part on the analog input and at least in part on the digital input; and a motor controller that utilizes the output from the processing component to generate a control signal for a motor.

2. The control circuit board of claim 1, wherein the digital unications support component includes a wireless communications module.

3. The control circuit board of claim 2, wherein the wireless communications module is communicatively coupled to a digital control input mechanism utilizing an ad-hoc wireless network.

4. The control circuit board of claim 1, wherein the stored digital input comprises a sensitivity setting, and wherein the processing component synthesizes the received analog input and the stored digital inputs by applying the sensitivity setting to the analog input, and wherein synthesizing the received analog input and stored digital inputs comprises reconciling the sensitivity setting from the stored digital input with the analog input.

5. The control circuit board of claim 1, wherein the stored digital input comprises a speed setting, and wherein the processing component synthesizes the received analog input and the stored digital inputs by applying the speed setting to the analog input, wherein synthesizing the received analog input and the stored digital inputs comprises reconciling the speed setting from the stored digital input- with the analog input.

6. The control circuit board of claim 1, wherein the stored digital input comprises an indication of an autonomy level, and wherein the processing component synthesizes the received analog input and stored digital inputs with the indicated autonomy level by applying the indicated autonomy level to the analog input, wherein synthesizing the received analog input and stored digital inputs comprises reconciling the indication of autonomy level from the stored digital input with the analog input.

7. The control circuit board of claim 6, wherein the autonomy level is fully manual.

8. The control circuit board of claim 6, wherein the autonomy level is semi-autonomous.

9. A method of generating a motor control signal comprising:

receiving an analog input from an analog control input mechanism;

receiving content from a cloud computing network wherein receiving content comprises purchasing or accessing a stored digital input for the digital input control mechanism wherein the digital control input mechanism comprises at least a user interface configured to receive the digital input:

synthesizing the analog input and the digital input to generate an output, wherein synthesizing comprises applying a first input to a second input, wherein the first and second inputs comprise one of the analog input or the digital input, utilizing the stored digital input obtained from the cloud computing network as a component of the synthesized output: and utilizing the output to generate the motor control signal, wherein the motor control signal has characteristics of both the analog input and the stored digital input factored in combination.

10. The method of claim 9, and further comprising:

receiving feedback from a motor; and synthesizing the motor feedback with the first, input and the second input to generate the output.

11. The method of claim 9, and further comprising:

receiving input from a sensor; and utilizing the input from the sensor to generate the output.

12. The method of claim 9, and further comprising:

receiving an indication of an autonomy level; and utilizing the indication of the autonomy level to generate the output.

13. The method of claim 9, wherein the control system comprises a device with a touch screen, and wherein the digital input component comprises a portion of the touch-screen.

14. A control system comprising:

an analog control input mechanism configured to receive an analog control input from a user;

a digital control input mechanism configured to receive a stored digital control input from a cloud computing network, wherein receiving comprises purchasing or accessing the stored digital input for the digital input control mechanism wherein the digital control input mechanism and the analog control input mechanism are integrated together as one unit, and wherein the analog control input communicates indirectly to the control circuit board through the digital control input mechanism; and a control circuit board that receives the inputs from both the analog and the digital control input mechanism and generates a single control signal that is a composite of the received analog control input and the stored digital control input.

15. The control system of claim 14, wherein the digital control input mechanism is communicatively coupled to the control circuit board utilizing a wireless connection.

16. The control system of claim 15, wherein the wireless connection comprises an ad-hoc wireless network.

17. The system of claim 14, and further comprising:

receiving an indication of a selected autonomy level, and wherein the selected autonomy level falls along a relative continuum between autonomous and manual control.

18. The system of claim 17, wherein the selected autonomy level is semi, but not completely manual.

19. The system of claim 18, wherein the selected autonomy level is semi, but not completely autonomous.

* * * * *